US010559019B1

(12) United States Patent
Beauvais

(10) Patent No.: US 10,559,019 B1
(45) Date of Patent: Feb. 11, 2020

(54) SYSTEM FOR CENTRALIZED E-COMMERCE OVERHAUL

(71) Applicant: Ken Beauvais, Lehigh Acres, FL (US)

(72) Inventor: Ken Beauvais, Lehigh Acres, FL (US)

(*) Notice: Subject to any disclaimer, the term of this patent is extended or adjusted under 35 U.S.C. 154(b) by 865 days.

(21) Appl. No.: 15/008,153

(22) Filed: Jan. 27, 2016

Related U.S. Application Data

(63) Continuation-in-part of application No. 14/730,870, filed on Jun. 4, 2015, now abandoned, which is a continuation-in-part of application No. 13/553,394, filed on Jul. 19, 2012, now abandoned.

(60) Provisional application No. 61/509,414, filed on Jul. 19, 2011.

(51) Int. Cl.
*G06Q 30/00* (2012.01)
*G06Q 30/06* (2012.01)
*G06T 19/00* (2011.01)

(52) U.S. Cl.
CPC ..... *G06Q 30/0625* (2013.01); *G06Q 30/0639* (2013.01); *G06Q 30/0643* (2013.01); *G06T 19/006* (2013.01)

(58) Field of Classification Search
CPC ........... G06Q 30/0625; G06Q 30/0639; G06Q 30/0643
USPC ....................................................... 705/27.2
See application file for complete search history.

(56) References Cited

U.S. PATENT DOCUMENTS

| | | | | |
|---|---|---|---|---|
| 2010/0030578 | A1* | 2/2010 | Siddique | G06Q 10/0637 705/3 |
| 2010/0223119 | A1 | 9/2010 | Klish | |
| 2011/0082748 | A1* | 4/2011 | Manu | G06Q 30/02 705/14.58 |
| 2012/0158553 | A1 | 6/2012 | Sudhidhanakul et al. | |
| 2012/0254194 | A1* | 10/2012 | Wu | G06Q 30/0633 707/747 |
| 2013/0325652 | A1* | 12/2013 | Ouimet | G06Q 30/06 705/26.7 |

OTHER PUBLICATIONS

Improving the Usability of E-Commerce Applications using Business Processes (Year: 2008).*

(Continued)

*Primary Examiner* — Jeffrey A. Smith
*Assistant Examiner* — Lalith M Duraisamygurusamy
(74) *Attorney, Agent, or Firm* — John Rizvi; John Rizvi, P.A.—The Patent Professor ®

(57) ABSTRACT

A social networking system for integrated electronic commerce includes an electronic commerce social network host company having a central office with a central computer and an instruction set stored on the central computer. At least one consumer and at least one business subscribe to the electronic commerce social network host. A first network terminal is accessible by the consumer for posting personal data and property inventories and a second network terminal is accessible by the business for posting product and service data descriptive of the product and service inventories. The terminals and the central computer are interconnected by an electronic network. The instruction set operates to receive and store the consumer posted data and the business posted product and service data and integrates the information data to match an individual consumer with an individual business for the sale of at least one of said products and services of the business.

19 Claims, 15 Drawing Sheets

(56) References Cited

OTHER PUBLICATIONS

Improving the Usability of e-Commerce Applications Using Business Processes, Ying Zou, Member, IEEE Computer Society, Qi Zhang, and Xulin Zhao, Student Member, IEEE, IEEE Transactions on Software Engineering, vol. 33, No. 12, Dec. 2007 (Year: 2007).*

* cited by examiner

SYSTEM FOR CENTRALIZED E-COMMERCE OVERHAUL

CROSS REFERENCE TO RELATED APPLICATIONS

This U.S. non-provisional patent application is a continuation-in-part of U.S. non-provisional patent application Ser. No. 14/730,870, filed on Jun. 4, 2015, which is a continuation-in-part of U.S. non-provisional patent application Ser. No. 13/553,394 filed on Jul. 19, 2012, which in turn, claims the benefit of U.S. provisional patent application No. 61/509,414, filed on Jul. 19, 2011, all of which are incorporated-by-reference herein in their entireties.

FIELD OF THE INVENTION

The present disclosure generally relates to a system for conducting electronic commerce, and more particularly to a system for electronically enhancing and integrating the marketing, purchase, selling, use, and disposal cycle of products.

BACKGROUND OF THE INVENTION

The Internet has changed our modern society forever; basically because of the services it provides. Anyone with access to the Internet can conduct a limitless number of operations and transactions, including researching, receiving the latest news and information as they occur, purchasing a product and services from all over the world, watching movies, being entertained, getting fashion tips, or other activity and information gathering operation.

Another advantage of the Internet is also its ability to create positive sharing interactions between people, including interchanging information, knowledge, commercial tips, etc. The Internet can amplify potentials in many ways. Seemingly, employers are experiencing accrued benefits from it. Most organizations have access to electronic mail (email) and video conferencing thereby reducing costs on mail, transport, and phone calls.

Through the Internet, companies can connect with employees, suppliers, partners and clients all over the world. Workers can be hired almost regardless of where they are, and developing countries have the opportunity to become economic powerhouses by providing information technology services to the rest of the world.

One of the latest Internet-related revolutions relates to social networking websites. Social networking is the grouping of individuals into specific groups formed by individuals who are looking forward to meeting other people, to gathering and sharing first-hand information and experiences about almost any topic, for example, sports, cooking, gardening, developing friendships or professional alliances, finding employment, business-to-business marketing and the like. Social networking websites function like an online community of Internet users with a common interest. As mentioned, social networking often involves grouping specific individuals or organizations together. There are a countless number of websites today that may be classified as social networking websites including but not limited to the following:
 a) Facebook.com: for sharing personal information and networking with friends and relatives;
 b) Academia.edu: for academics and researchers;
 c) Cakefinancial.com: for investors;
 d) Passportstamp.com: for travelers;
 e) Twitter.com: general micro blogging; and
 f) Linkedin.com: business and professional networking.

There are also other networking solutions with commercial applications. For example, a method for financing entertainment media production companies comprises:
 a) a social network service providing a way for member/producers and member/investors to form communities in order to produce and invest in entertainment media companies,
 b) an alternative trading system enabling member/producers and member/investors using the social network service through the Internet enabled digital devices to list, quote, buy, sell and trade in initial public offerings and/or secondary trading of equity shares of entertainment media companies; and
 c) electronic communication networks that match buy/sell orders of entertainment media companies selling equity stocks with investors purchasing said stocks.

Even though the above-cited networking examples of the prior art address some of the needs of the market, a new improved networking system for sharing information between customers (consumers, business, and marketers) for an e-commerce system to share, trade, sell, buy, market, donate, offer suggestions and give feedback on any product is desired. More specifically, a networking system for e-commerce wherein the merchant, marketer and consumer interaction is integrated within a unitary system is needed. Furthermore, a process that mines data where users can refer to it at any time is needed. There exists a need for a system that bridges the gap of online and off-line purchases, where the purchases an individual makes at traditional brick and mortar stores is mined in a social networking atmosphere for the benefit of the consumers, business, and marketers.

SUMMARY OF THE INVENTION

The present disclosure is generally directed to a social networking system for integrated electronic commerce that satisfies the need for improved electronic commerce. The system includes an electronic commerce social network host company having a central office with a central computer, memory storage unit, and an instruction set stored on said memory storage unit comprising a computer readable medium one of which can be and executable by said central computer. At least one consumer subscribes to the electronic commerce social network host. A first network terminal is accessible by the consumer for posting personal information data and personal property inventories. At least one business merchant subscribes to the electronic commerce social network host and has a second network terminal accessible for posting product and service inventories and information data descriptive of the product and service inventories. At least one marketer subscribes to the electronic commerce social network host and has a third network terminal accessible for posting marketing materials (images, videos, information, etc.) and their objective. An electronic network connects the first network terminal, the second network terminal and the third network terminal with the central computer at the electronic commerce social network host company. The executed instruction set operates on the central computer to receive and store on the memory storage unit the consumer posted personal and property information data and the business posted product and service inventory information data and integrates the information data to match an individual consumer with an individual business for the sale of at least one of said products and services of the business.

In one aspect, the executed instruction set can match consumer's posted inventory with items that are compatible with merchants' posted product and service inventory.

In another aspect, the executed instruction set reminds consumers' to pick up an item they purchase previously as they pass it in a store isle.

In yet another aspect, the executed instruction set directs consumers to items in other locations in the store that relate to items the consumers previously purchased.

In yet another aspect, the electronic network is the Internet.

In yet another aspect, first network terminal is located in a private home.

In yet another aspect, the first network terminal is located in a physical store (brick & mortar).

In yet another aspect, the first network terminal is a refrigerator.

In yet another aspect, the first network terminal is a Television.

In yet another aspect, the first network terminal is a vehicle.

In yet another aspect, the first network terminal is a portable electronic device.

In yet another aspect, the portable electronic device includes a wireless connection to the Internet.

In yet another aspect, the system further includes at least one marketer subscribing to the electronic commerce social network host and a third network terminal is connected to the electronic network and is accessible by the at least one marketer for receiving the consumer posted personal and property information data and the business posted product and service information data.

In yet another aspect, the at least one marketer integrates the consumer posted personal and property information data and the business posted product and service information data to generate a targeted marketing message relating to at least one of the business' products and services offered to the at least one consumer.

In yet another aspect, the targeted message is sent to the consumer while the consumer is shopping in a physical store.

In yet another aspect, the targeted message is sent while the consumer is shopping in the virtual store.

In yet another aspect, the targeted message is sent in real time in relation to the real time data.

In yet another aspect, the system further includes a second consumer having a fourth network terminal electronically connected to said electronic network and subscribing to said electronic commerce social network host.

In yet another aspect, each consumer in interaction with the executable instruction set creates a virtual closet for depicting a visual inventory of each consumer's wardrobe.

In yet another aspect, the at least one consumer and the second consumer interacting with said executable instruction set are able to view each other's virtual closet.

In yet another aspect, at least one business in interaction with said executable instruction set can view the virtual closet of the at least one consumer.

In yet another aspect, the virtual closet of at least one consumer includes a virtual mannequin and the at least one consumer in interaction with the executable instruction set can virtually dress the mannequin with articles of clothing from the virtual closet.

In yet another aspect, the at least one business in interaction with the executable instruction set can virtually dress the mannequin with virtual clothes offered for sale by said business to aid the at least one consumer in making an e-commerce purchase decision.

In yet another aspect, each business in interaction with executable instruction set creates a virtual store for depicting visual inventory of businesses' physical store.

In yet another aspect, at least one consumer interacting with said executable instruction set can view and interact with the virtual store.

In yet another aspect, at least one consumer interacting with said executable instruction set can verify if items in virtual store are compatible with items in there virtual closet.

In yet another aspect, the consumers sees that the color of the shoes match the color of the hat in the virtual store.

In yet another aspect, the consumer can do this while standing in a physical store.

In yet another aspect, a method for conducting integrated electronic commerce between a business and a consumer includes providing the consumer and the business with a network terminal communicatively interconnected to an electronic commerce social network host company having a central office including a central computer, memory storage unit, such as a large hard drive and an instruction set stored on the memory storage unit and executable by the central computer having a CPU. Personal data is entered onto the memory storage unit by the consumer by interaction with the executable instruction set. An inventory of personal property owned by the consumer is entered onto the memory storage unit by interaction with the executable instruction set. Future purchases are completed by interaction with the executable instruction set and are automatically added onto the memory storage unit. An inventory of offered products and services of the business is entered onto the memory storage unit by interaction with the executable instruction set. The stored data on the memory storage unit is integrated by executing instruction set with the central computer to match an individual consumer with an individual business for the sale of at least one of the products and services offered by the business.

In yet another aspect, after the entering an inventory step, the step of creating a virtual room representative of related property items is included.

In yet another aspect, wherein the virtual room is a virtual clothes closet.

In yet another aspect, wherein the virtual room is the merchants store.

In yet another aspect, wherein the virtual clothes closet includes a mannequin.

In yet another aspect, after the creating a virtual room step, the step of dressing the mannequin with the consumer's virtual clothes according to the property inventory is included.

In yet another aspect, after the dressing step, the step of allowing a business to access the consumer's virtual clothes closet is included.

In yet another aspect, after the allowing step, the step of dressing the mannequin with virtual clothes from the inventory data entered by the business is included.

An e-commerce enhancing system is disclosed. The system comprises one or more storage machines holding instructions executable by one or more logic machines to, at a personal computing device, receive product identification data relating to a potential e-commerce interest of a user, at a product identifier, identify a product profile of a plurality of archived product profiles that matches the product identification data, at an e-commerce enhancement data generator, generate e-commerce enhancement data based on the product profile, the e-commerce enhancement data configured to enhance e-commerce experience relating to the potential e-commerce interest, and present the e-commerce enhancement data to the user via a display subsystem of the personal computing device.

In another aspect, the product identification data originates from a machine-readable data tag embedded in the potential e-commerce interest.

In another aspect, the product identification data originates from a manual user input that specifies user preferences relating to the potential e-commerce interest.

In another aspect, the e-commerce enhancement data includes a targeted marketing message to market the product profile to the user according to the potential e-commerce interest.

In another aspect, the archived product profiles include three-dimensional virtual models.

In another aspect, the instructions are further executable to, receive a depth map of a real-world environment, and present the e-commerce enhancement data to the user by overlaying an augmented reality rendering of the e-commerce enhancement data on the depth map.

In another aspect, the instructions are further executable to, receive an inventory user input for modifying a personal inventory, the personal inventory being configured to hold and display user-selected product profiles, and present the personal inventory to the user in a three-dimensional virtual space via the display subsystem.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
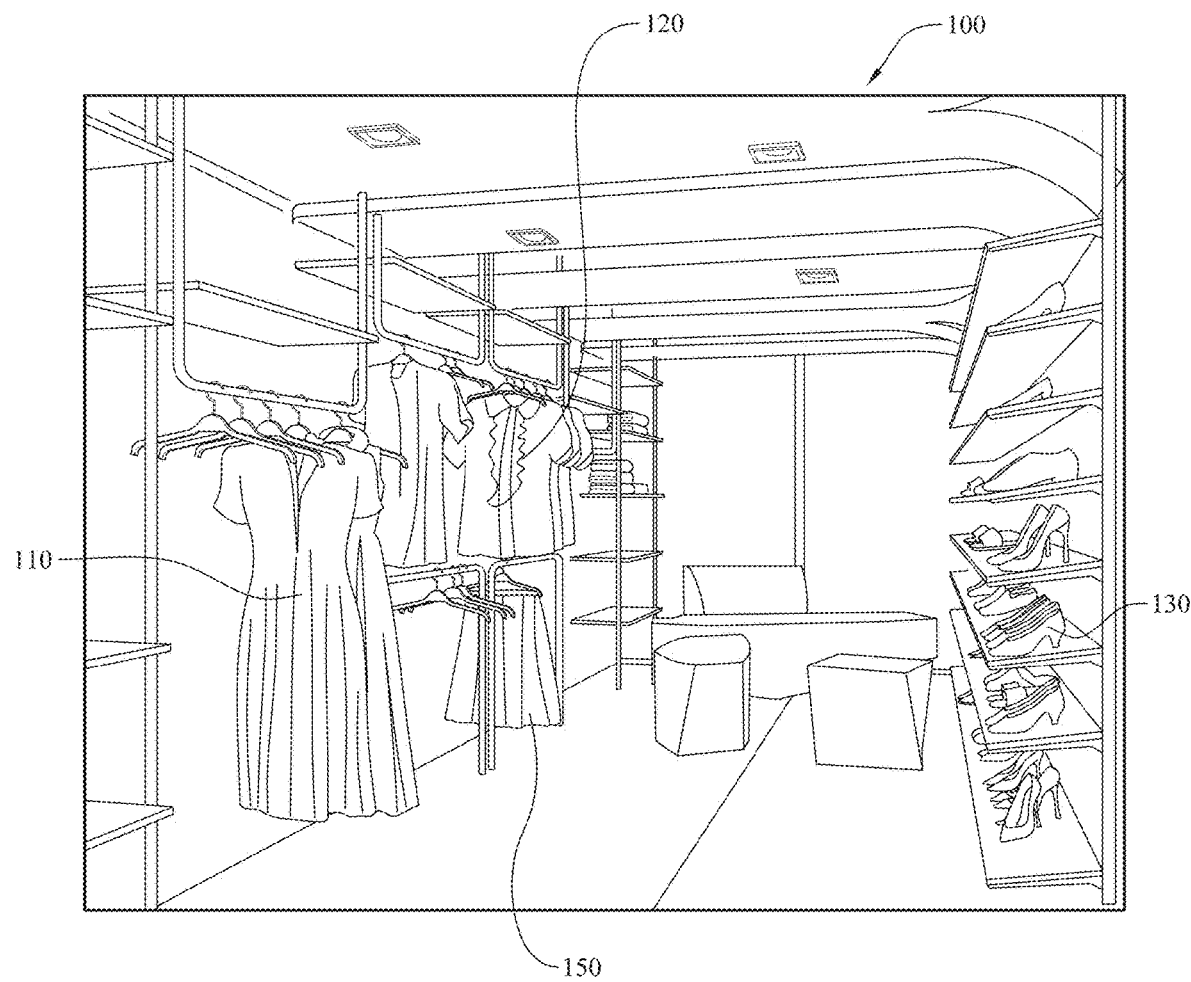
FIG. 1 presents a general perspective view of the virtual closet application embodying the present invention, wherein a part of the user's closet online is shown.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purpose of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

During the present description, the following terms will be used, and the definition may be found below:

SOCIAL NETWORK SERVICE: is an online service, platform, or site that focuses on building and reflecting of social networks or social relations among people, e.g., who share interests and/or activities. A social network service essentially consists of a representation of each user (often a profile), his/her social links, and a variety of additional services. Most social network services are web based and provide means for users to interact over the Internet, such as e-mail and instant messaging. Online community services are sometimes considered as a social network service, though in a broader sense, social network service usually means an individual-centered service whereas online community services are group-centered. Social networking sites allow users to share ideas, activities, events, and interests within their individual networks.

CUSTOMER RELATIONSHIP MANAGEMENT (CRM): is a widely-implemented strategy for managing a company's interactions with customers, clients, and sales prospects. It involves using technology to organize, automate, and synchronize business processes principally sales activities, but also those for marketing, customer service, and technical support. The overall goals are to find, attract, and win new clients, nurture and retain those the company already has, entice former clients back into the fold, and reduce the costs of marketing and client service. Customer relationship management describes a company-wide business strategy, including customer-interface departments as well as other departments.

INVENTORY CONTROL SYSTEM: is a process for managing and locating objects or materials. In common usage, the term may also refer to just the software components. Modern inventory control systems often rely upon barcodes and Radio Frequency Identification Device (RFID) tags to provide automatic identification of inventory objects. In an academic study performed at Wal-Mart, RFID reduced Out of Stocks by 30 percent for products selling between 0.1 and 15 units a day. Inventory objects could include any kind of physical asset: merchandise, consumables, fixed assets, circulating tools, library books, or capital equipment. To record an inventory transaction, the system uses a barcode scanner or RFID reader to automatically identify the inventory object, and then collects additional information from the operators via fixed terminals (workstations), or mobile computers. NFC devices or tags may also be included in an inventory control system. An inventory control system may be used to automate a sales order fulfillment process. Such a system contains a list of order to be filled, and then prompts workers to pick the necessary items, and provides them with packaging and shipping information. An inventory system also manages in and outwards material of hardware. Real time inventory control systems may use wireless, mobile terminals to record inventory transactions at the moment they occur. A wireless Local Area Network (LAN) transmits the transaction information to a central database. Physical inventory counting and cycle counting are features of many inventory control systems that can enhance the organization.

ELECTRONIC COMMERCE: commonly known as e-commerce or E-Commerce, relates to the buying and selling of products or services over electronic systems such as the Internet and other computer networks. The amount of trade conducted electronically has grown extraordinarily with widespread Internet usage. The use of commerce is conducted in this way, spurring and drawing on innovations in electronic fund transfer, supply chain management, Internet marketing, online transaction processing, electronic data interchange (EDI), inventory management systems, and automated data collection systems. Modern electronic commerce typically uses the World Wide Web at least at some point in the transaction's life cycle, although it can encompass a wider range of technologies such as e-mail as well. For purpose of description, e-commerce may also be referred to as shopping, patronage, or custom. For example, "patronage" may be defined as business given to a store, restaurant, or public service by a person or group. "Shopping" may be defined as the purchasing of goods from stores, or in some instances restaurants. "Custom" may be defined as regular dealings with a shop or business by customers.

SOFTWARE AS A SERVICE (SAAS): sometimes referred to as "software on demand," is software that is deployed over the Internet and/or is deployed to run behind a firewall on a local area network or personal computer. With SAAS, a provider licenses an application to customers either as a service on demand, through a subscription, in a "pay-as-you-go" model, or (increasingly) at no charge. This approach to application delivery is part of the utility computing model where all the technology is in the "cloud" accessed over the Internet as a service.

CONTEXT-AWARE COMPUTING (CAC): It refers to a general class of mobile systems that can sense their physical environment, and adapt their behavior accordingly. Such systems are a component of a ubiquitous computing or pervasive computing environment. Three important aspects of context are: (1) where you are: (2) who you are with; and (3) what resources are nearby. Although the location is a primary capability, location-aware does not necessarily capture things of interest that are mobile or changing. Context-aware in contrast is used more generally to include nearby people, devices, lighting, noise level, network availability, and even the social situation; e.g., whether you are with your family or a friend from school.

PATTERN-BASED STRATEGY (PBS): is a framework for proactively seeking and acting on the early and often-termed "weak" signals forming patterns in the marketplace. It is also about the ability to model the impact of patterns on your organization and identify the disciplines and technologies that help you consistently adapt.

AUGMENTED REALITY (AR): is a live, direct or indirect, view of a physical, real-world environment whose elements are augmented by computer-generated sensory input such as sound, video, graphics or GPS data. It is related to a more general concept called mediated reality, in which a view of reality is modified (possibly even diminished rather than augmented) by a computer. As a result the technology functions by enhancing one's current perception of reality. By contrast, virtual reality replaces the real world with a simulated one. Augmentation is conventionally in real-time and in semantic context with environmental elements, such as sports scores on TV during a match. With the help of advanced AR technology (e.g. adding computer vision and object recognition) the information about the surrounding real world of the user becomes interactive and can be digitally manipulated. Artificial information about the environment and its objects can be overlaid on the real world. In some instances, augmented reality and mixed reality overlap in functionality, definition and plain meaning.

MIXED REALITY (MR); (encompassing both augmented reality and augmented virtuality) refers to the merging of real and virtual worlds to produce new environments and visualizations' where physical and digital objects co-exist and interact in real time. A mix of reality, augmented reality, augmented virtuality and virtual reality. In some instances, augmented reality and mixed reality overlap in functionality, definition and plain meaning.

Figure 6:
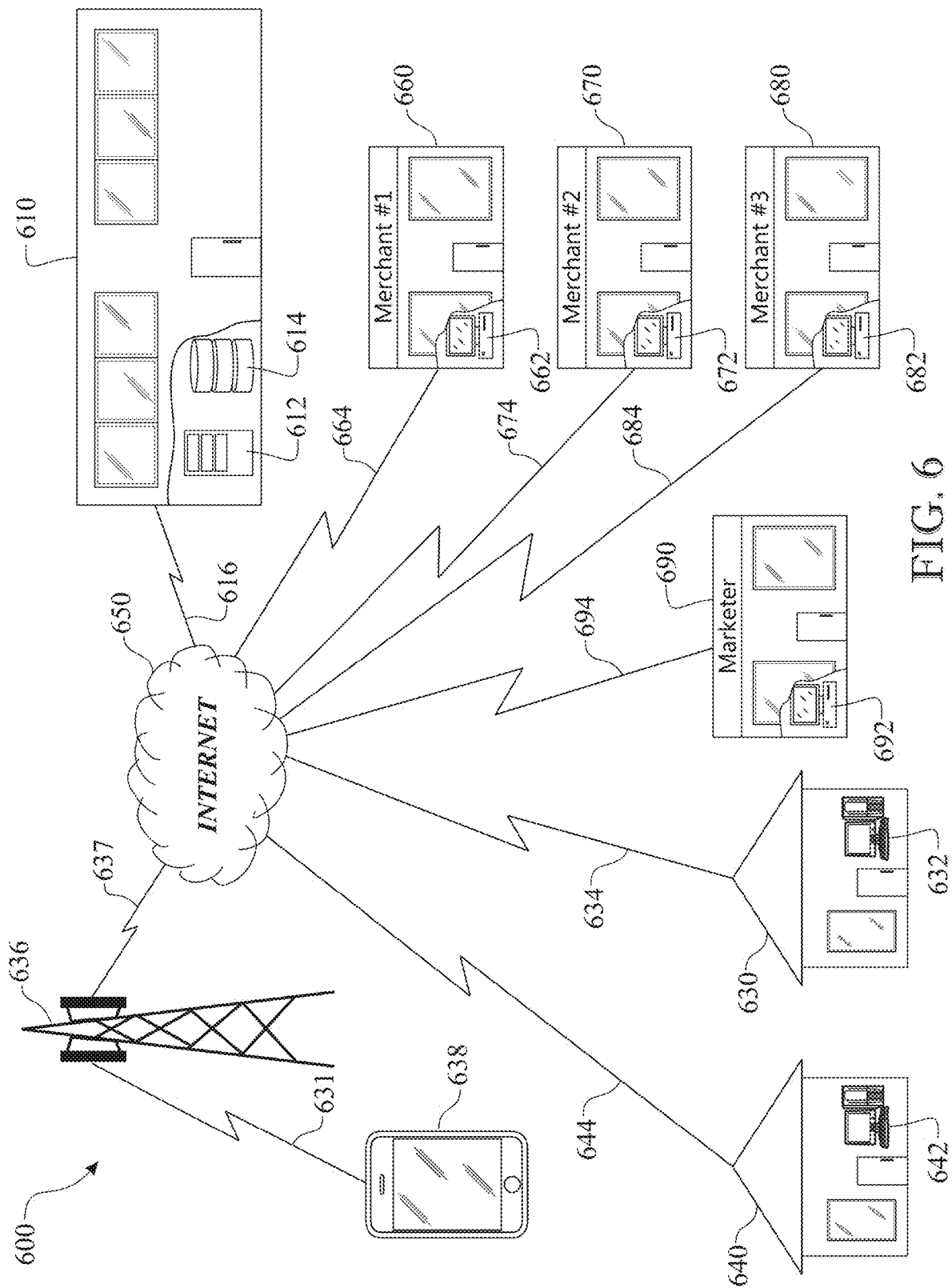
FIG. 6 presents a schematic depiction of a network based social networking system for integrated electronic commerce.
Figure 7:
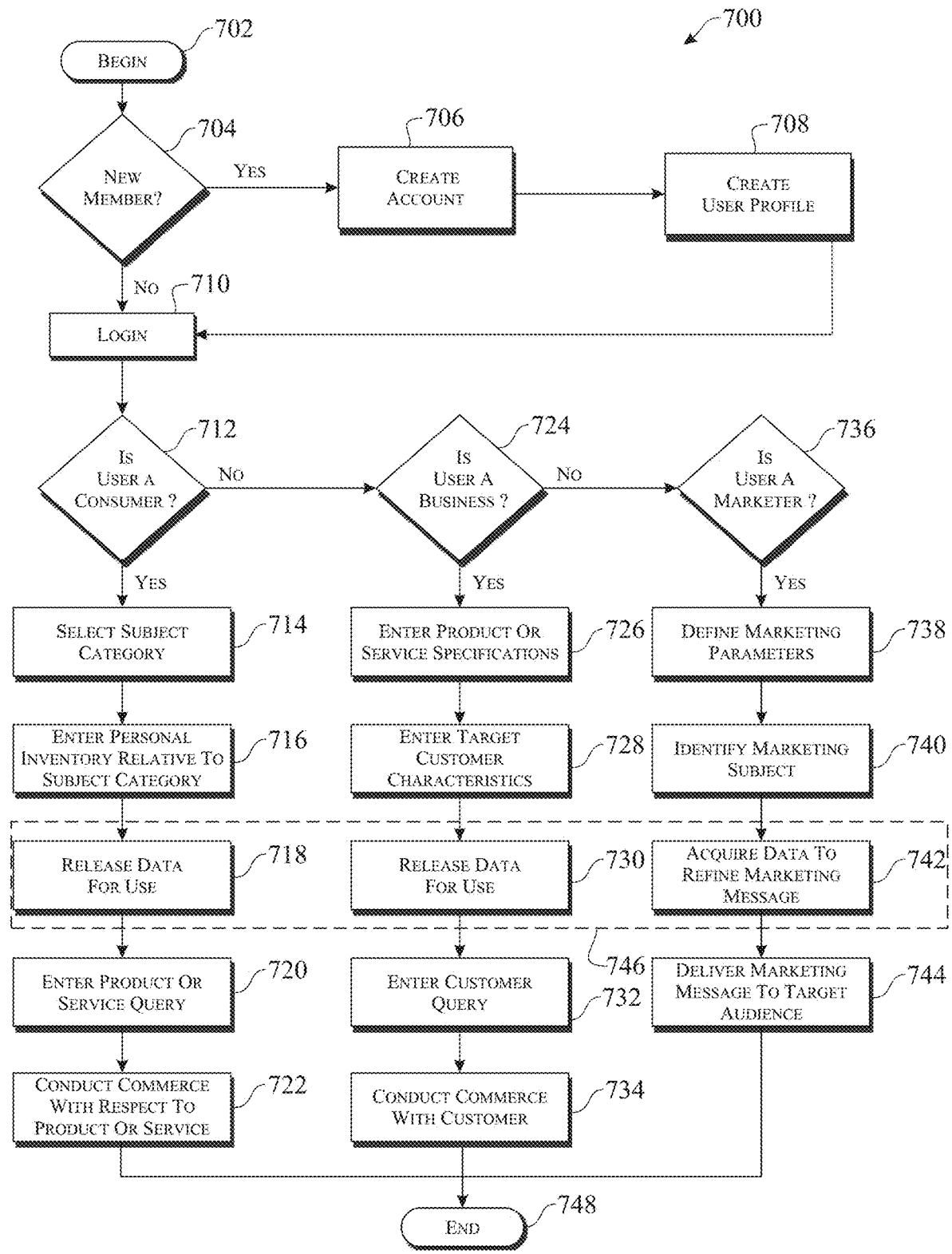
FIG. 7 presents a flow chart diagram of a method for conducting integrated electronic commerce utilizing a social network.

Turning to the drawings, one embodiment of the present invention is illustrated in FIGS. 6-7 wherein FIG. 6 shows a social networking system implementing an integrated electronic commerce system 600 for collecting and integrating consumer specific product usage and information needs of specific consumers 630, 640 with product specifications of products offered by merchants 660, 670, 680 to optimize the matching of a specific consumer 630, 640 with a specific product and to provide consumer and product information to marketer 690.

Integrated electronic commerce system 600 is based at a central office 610 of an electronic commerce social network host company. The electronic commerce social network host central office 610 houses a central computer 612 and/or a server executing an instruction set for collecting consumer and product data, processing the data to match consumers and products, and facilitating communication between consumers 630 and 640 and between consumers 630, 640 and merchants 660, 670, 680 to establish an integrated electronic commerce social network. The computer 612 is further interconnected with a searchable storage medium 614 on which the data files of personal data of consumers 630, 640 and the products of merchants 660, 670, 680 are saved. Computer 612 is also connected to an external electronic network 650 such as the Internet with a communications link 616 for communicating with entities outside of central office 610.

One or more merchants 660, 670, 680 (i.e. business users), marketer 690, consumers 630, 640, (i.e. consumer users) participate in providing the necessary personal and product information at central office 610 (i.e. at a server computing device). Each of the consumers 630, 640, merchants 660, 670, 680, and marketer 690 has a network terminal 632, 642, 662, 672, 682, and 692 respectively such as a personal computer that is further electronically linked to Internet 650 via electronic communication links 634, 644, 664, 674, 684, and 694. Those practiced in the art will readily recognize that network terminals 634, 644, 662, 672, 682, and 692 can also take the form of other known communication devices capable of connecting with networks and communication via voice or text messaging. In this manner, consumers 630, 640, merchants 660, 670, 680, and marketer 690 can communicate with central office 610 of the data control agent utilizing the communication protocols of the Internet and the instruction set executed by computer 612 at central office 610 or a server as described herein.

In a like manner, a consumer 630, 640 (or other individual or entity hereinafter collectively referred to as a consumer) can also communicate with the host at central office 610. The consumer 630, 640 typically communicates over Internet 650 utilizing a network terminal 632 via link 634 or a portable personal electronic device 638 communicative via link 635 of dedicated communications network 636. Personal communication device 634 is most preferably a device more commonly known as a 'smart phone' (i.e. a personal computing device) having a central processor capable of executing downloadable application software or using software as a service that runs through the web-browser. Communications network 636 is further communicative with Internet 650 via communications link 637. Alternatively, consumers 630, 640 can use the network terminal 632 such as a personal computer, television, vehicle entertainment system, refrigerator, etc., which is communicative with Internet 650 via electronic communication links 634. Those practiced in the art will readily recognize that personal electronic device 638 can be a smart phone, a personal digital assistant (PDA), a netbook, a computing tablet, or other similar device currently available or available in the future that exhibits electronic communications abilities such as text messaging, email, or other communication protocols. For example, augmented reality headsets or head-mounted display devices are suitable personal electronic computing devices.

The present invention refers to a social networking website that gives the user real time data on consumers, marketers, and companies in any business/industry around the world. This site is a place where people can share, trade, sell, market, buy, donate, offer suggestions and give feedback on any product in real time online and offline (via the Internet or a physical location).

From the back end perspective, the present invention is a place for companies to sell, market, manage and learn more about their products and the people who are interested in the products or in purchasing them, through combining social networking, customer relationship management, inventory control systems, e-commerce, software as a service, pattern based strategy and context-aware computing.

Each item alone represents something that everybody may have seen before but combined, it turns into something much more creative. This is a "product" that creates an environment where companies and consumers know everything about each other, products, created, and when, where and how they are needed.

The Internet 650 and mobile devices 638 are used in such a way as to revolutionize commerce. The method of commerce removes the guessing out of buying (shopping) and selling (marketing). The centralized E-commerce overhaul system in accordance with the present invention brings merchants 660, 670, 680 in a given industry to one website that manages their customers, inventory, marketing, and database across all industries. Furthermore, it brings all consumers 630, 640 in that given industry to the same website that manages their purchase cycle data, interest, reviews, friends, etc.

The following example defines one of many examples where it is possible to create using the system in accordance with the present invention. This example is called "The Virtual Closet" or "The Online Closet" but it should not be interpreted as a limitation to the present invention as the present system is not limited to clothing, and it can be used in almost any industry, including automobile, real estate, furniture, restaurant, education, and more.

The Virtual Closet is a social networking website that gives the customer real time data of "clothes" in the individual's closet and stores around the world. This is a place where people can share, trade, sell, buy, donate, and even offer suggestions and feedback on whatever the users wear.

Clothing is an important part of most people's daily lives and represents much more than just shirts, pants, and shoes. Using the online platform in accordance with the present invention, the user may share his/her closet virtually over the Internet. As illustrated in FIG. 1, the system may virtually show the interior of the user's closet 100 exactly as a picture of a real closet (or according to a depth map of the user's closet). The idea is to purchase things to add to his/her closet or adjust the look and feel of his/her online closet. Other friends may do the same and share their information online. Therefore, it is also possible to look in their friends' closets, offer users suggestions on what to wear and eventually buy, trade, sell, share, or even donate their clothing. In this particular case, the closet 100 may include a different type of clothing, including dresses 110, blouses 120, shoes 130, and skirts 150. Other articles of clothing may also be illustrated.

Figure 2:
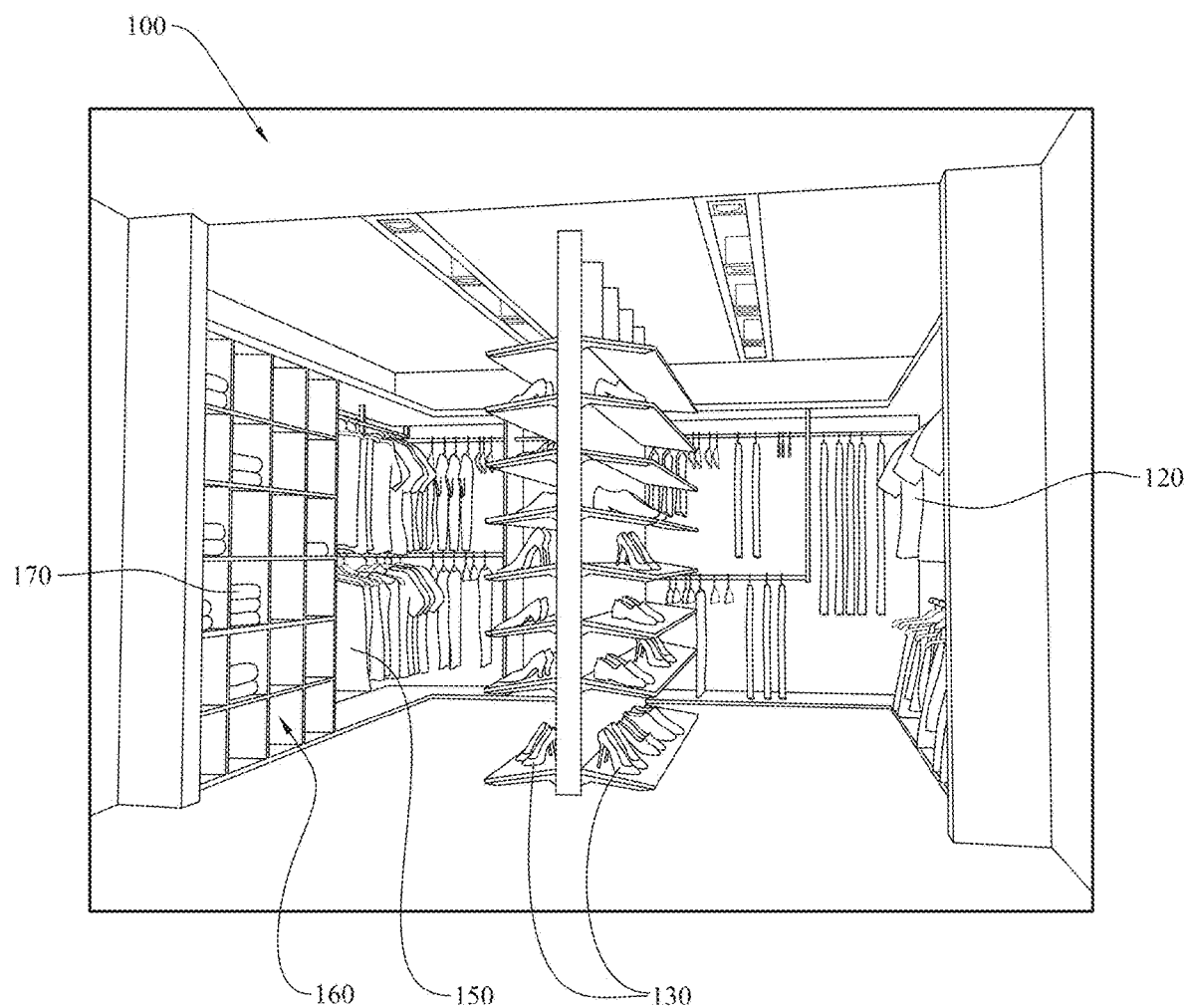
FIG. 2 presents a second perspective view of the virtual closet.

FIG. 2 is another example of what the virtual closet of a particular user may look like, and may also be an example of what the user would like his/her closet to look like. In this case, shelves 160 may also be included with T-shirts 170 and the like. Using the same concepts, and based on real inventories, companies can create their closets to represent store inventory.

Figure 3:
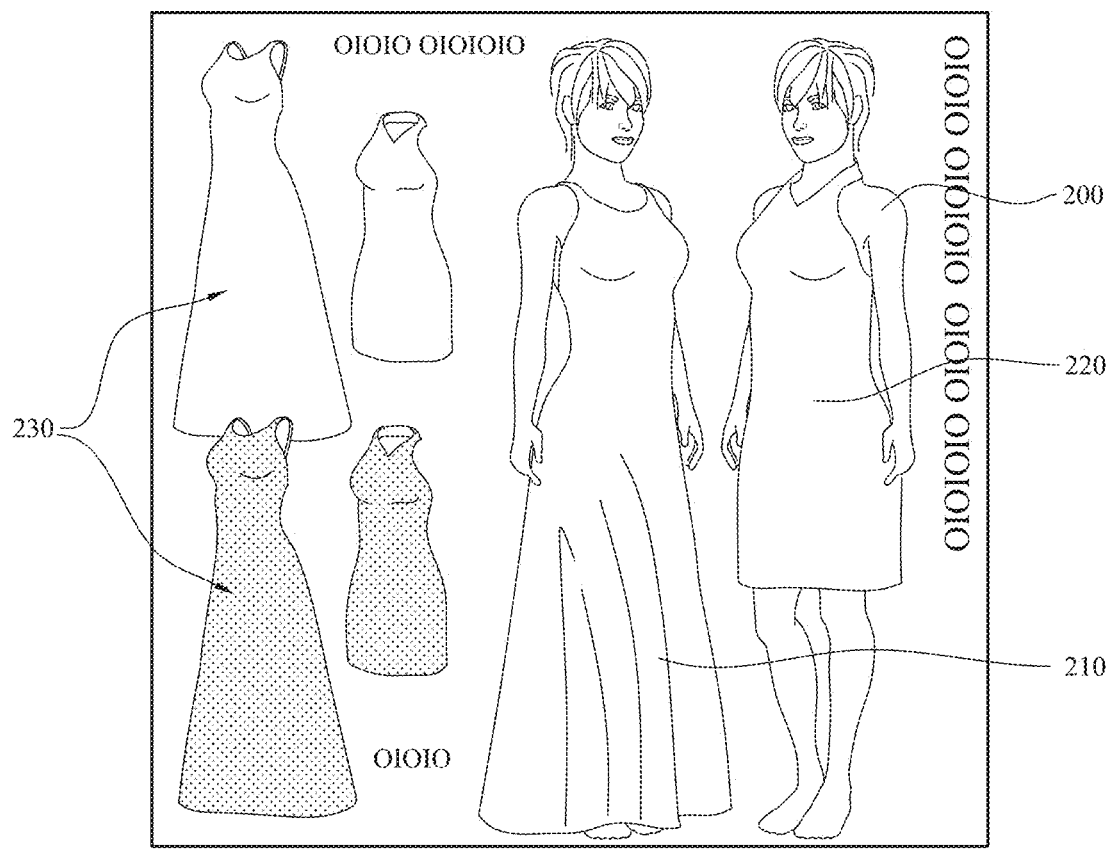
FIG. 3 presents a feature of the virtual closet with which the user may virtually try on differing clothing combinations.
Figure 3:
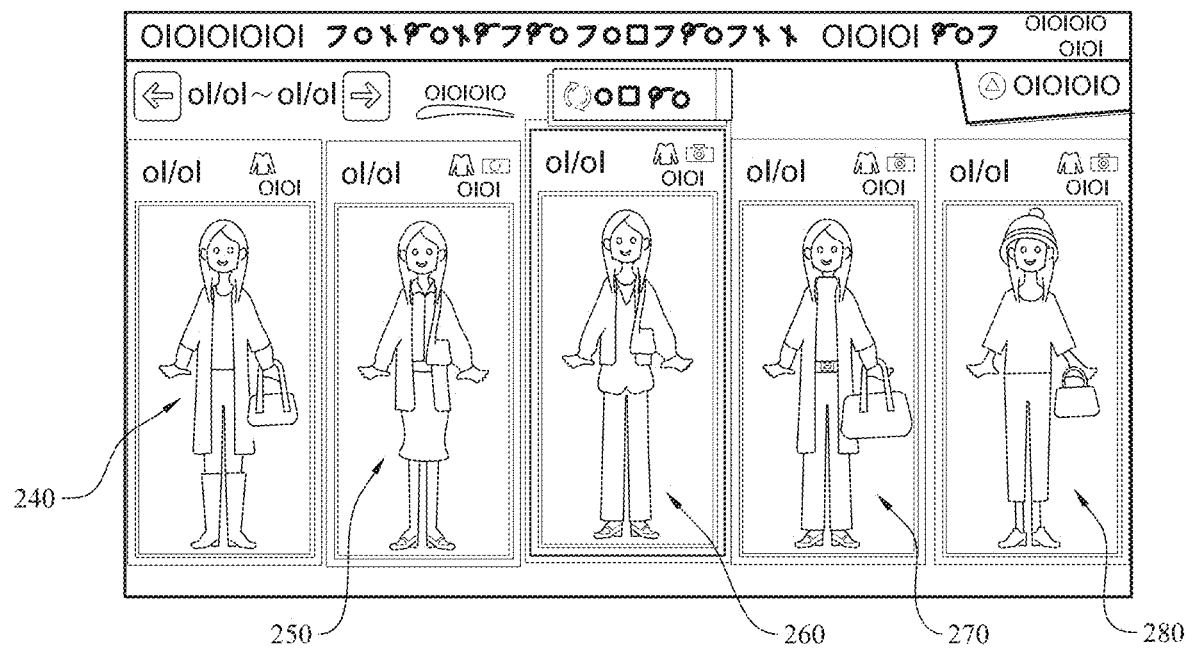
Figure 4:
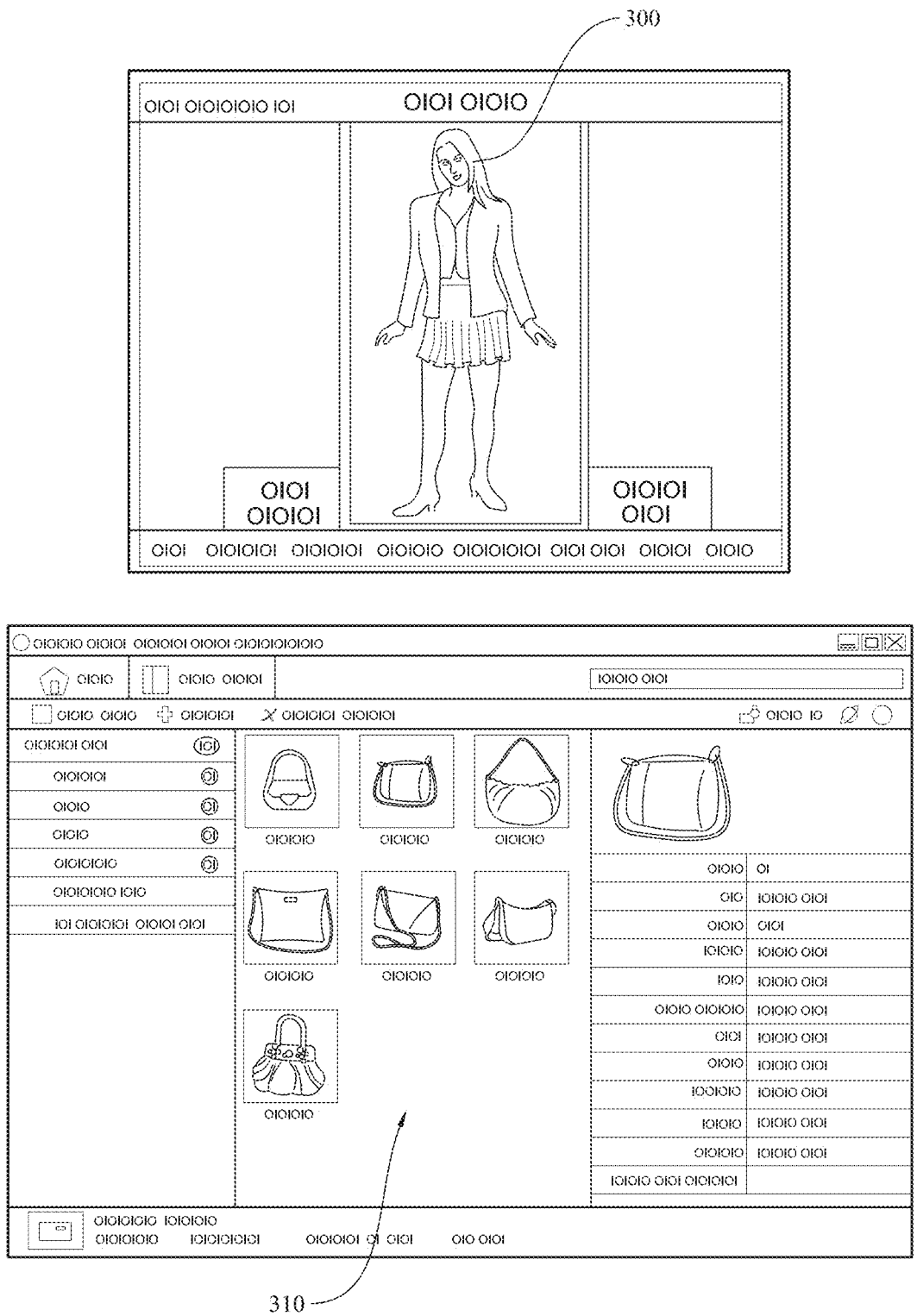
FIG. 4 presents a feature of the virtual closet wherein the user may evaluate combinations of clothing and accessories.
Figure 5:
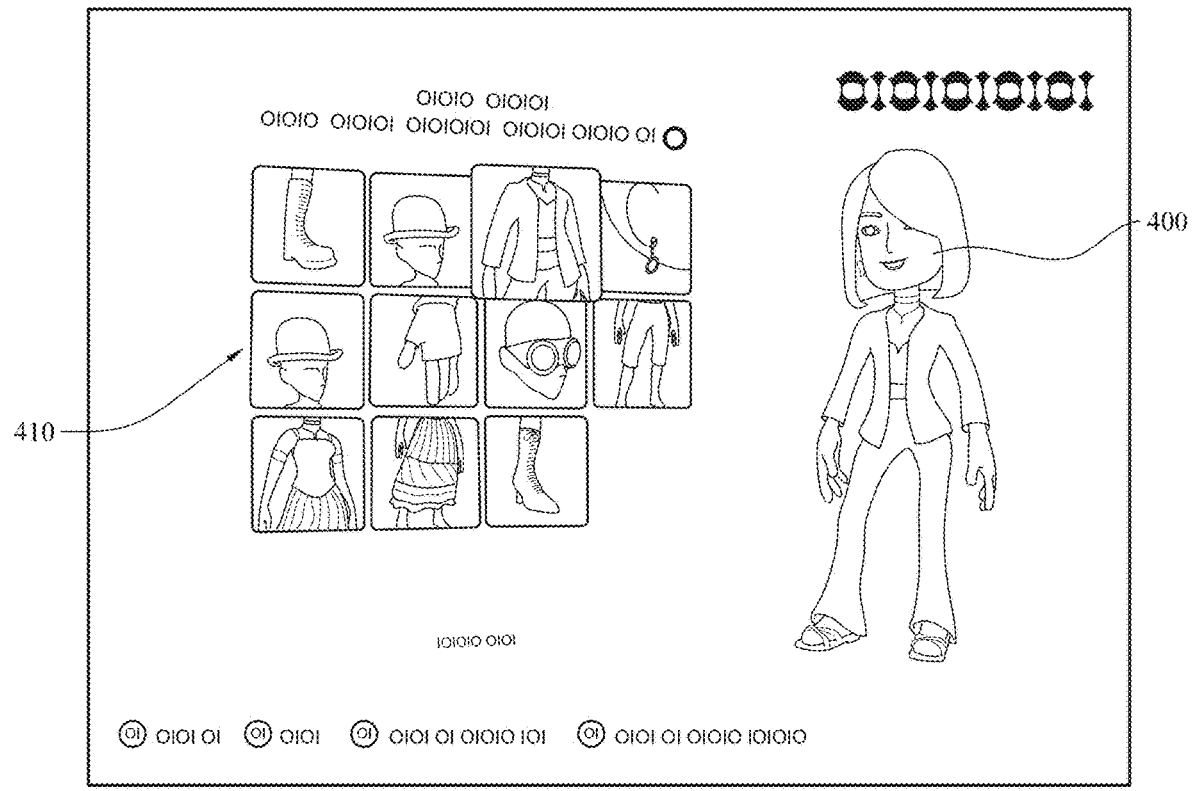
FIG. 5 presents an alternate feature of the virtual closet wherein the user may evaluate combinations of clothing and accessories.
Figure 5:
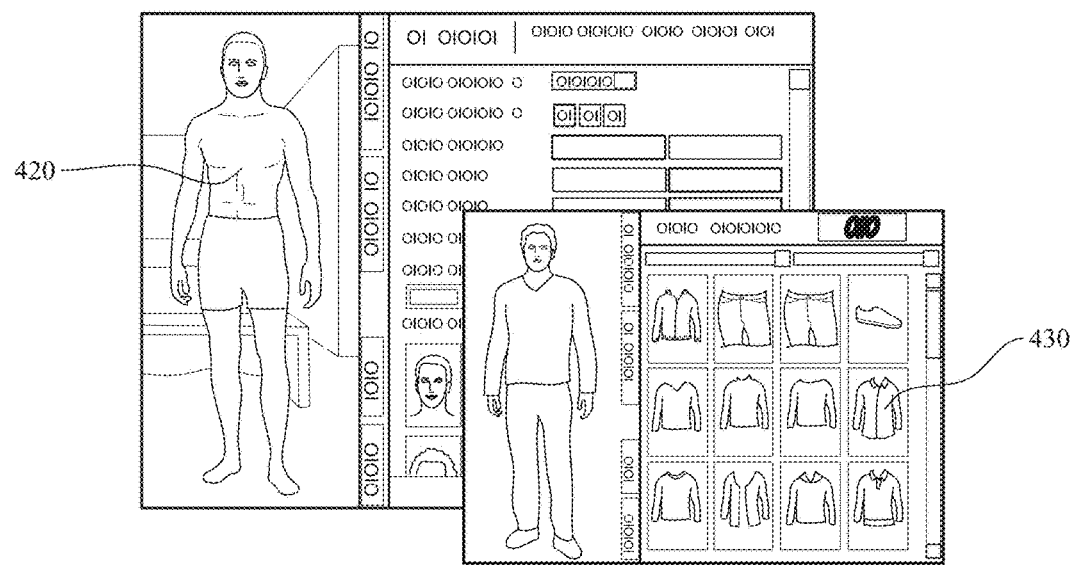

The Virtual Closet may be accessible not only through computers but also for smart phones for remote access, and it is possible to get information on clothes (manufacturer, materials, size, and other characteristics.). As illustrated in FIGS. 3-5, it is possible to input the user's clothing size, height, shoes size, and other personal data to try on clothes virtually. In some embodiments a three dimensional depth map of a user's body part may be used to overlay product models on the depth map for providing an appearance or sensation of clothes on. Once the system incorporates the physical features of the user (see at the bottom of FIG. 5), then different pieces of clothing and colors may be tried on.

For example, FIG. 3 illustrates an embodiment in which the shape of the user 200 may be used to try on different pieces of clothing. For example, a long dress 210, a short dress 220 and also different colors 230 of the same article. Furthermore, different combinations of clothing and accessories may be shown. For example, with boots and a purse 240, with skirt and shoes 250, with trousers 260, with pants and a purse 270 or with a hat, purse and trousers 280.

FIG. 4 shows another embodiment of the Virtual Closet application in which the user 300 may combine different accessories, for example, different types of purses 310.

FIG. 5 shows yet another embodiment using a figure of a doll 400 or the like to try on different combinations of pieces of clothing and accessories 410, or the real picture of the user's body 420 and a set of different pieces of clothing and accessories 430.

The present system may also include the following features:

- Clothes can be added to the online closet at the point of sale.
- Mobile payment functionality.
- The user may design his/her closet (shelves, hangers, drawers).
- Updates are received when items the user is looking for are added to a store.
- A smart phone may be used to access the virtual closet to match colors, materials, and designs of products the user owns with items for sale in a store.
- Phones may also be used to scan items in stores and check who in the network owns the item.
- A wish list may be uploaded from stores (e.g. via scanning an item data tag such as a barcode).
- The purchase can be made and added to system simultaneously whether in the physical store or via the Internet.
- It is also possible to search, what artists, athletes, actors, politicians, and other public figures were wearing at events, in movies, videos, magazines, TV, mentioned in a song, and the like.
- Scanning listing of clothes from magazines, newspapers, brochures, or other publications to search for the item via the system.
- Searching the availability and location of items.
- Items can be placed on hold to purchase them at the store or just order the item online.
- Merchants can list items that are discontinued to check the demand for the product (to sell again later).
- All barcode tags for clothing can be easily tracked (or RFID or NFC devices).
- Barcode tags may include metadata.
- People (consumers) can message owners (other consumers) of items to see if they are willing to sell them.
- Items can be posted that the user wants and desires to buy and the price he/she is willing to pay for them.
- The items will go straight to the customer, (just in time inventory).
- A wallet may be accessed on the site where funds may be deposited.
- Email addresses can be provided to the user that will be integrated into his/her website experience (multiple inboxes).
- Stores can be added to the user's favorites.
- Updates may be received when the favorite stores have sales and have added new items.
- Stores can be requested to be added to the site.
- Alerts can be obtained when friends, celebrities, or athletes purchase a new item.
- A store locator by brand, store name, items, area, or other characteristic can be provided.
- A virtual version of a store may be supplied (click through departments).
- Rating stores in different categories can be done (receive a reward (monetary) in response to submitting a rating of a store).
- Setting a level of privacy (i.e. location can be Coral Springs, Broward County, South Florida, Florida, USA, North America, Earth, Universe) can be carried out.
- It allows users to give feedback (what they would like to see).
- It allows a user to vote on other users' feedback to prioritize changes.
- Furthermore, it gives small businesses a good shot at selling their clothes.
- It gives clients discounts on products when they sign up.
- It allows for video conferencing via the site (user, client, and store).
- It allows you to know where and what you logged in from (increased security).
- It lets the user know if he/she walks by a store that has items that the user likes and who from his/her friends purchased items there before (i.e. with a mobile device).
- Profile settings can do searches (like/dislike search).
- Setting up personal preferences, updates, alerts, themes, or other can be accomplished.
- Buying from multiple vendors with a single shopping cart.
- It projects clothes on to a spinning mannequin, or even projects clothes with an avatar version of the user.
- Money (Income)
- Premium business model.
- Provide advertisement space.
- Charge a commission for each sale
- Charge companies, stores, and designers to add closet (inventory) listings.
- Allow users to purchase clothes via the website.
- Charge companies to sell to users.
- Charge companies to use it as their CRM system.
- Charge companies to use it as their inventory system.
- Charge users to sell their clothing (e.g. price decreases from the original purchase price, reverse auction).
- Charge companies for the bandwidth and space used.
- Charge users a monthly subscription fee.
- Other Benefits
- Users will not have to worry about calling every store of a chain.
- Shopping online will be almost like shopping at a mall.
- Offline purchases will be minimized (eventually cease to exist).
- The need for companies to have their own site will be removed.
- The need for physical stores will not be required.
- People will be able to stop wearing the same clothes among the same group of friends since the system provides a way for users to see what other users own.
- Users can easily find what is needed, when needed.
- Clothes will be managed like never before via an inventory management system.
- People will be able to manage their own purchase cycle data.
- The disclosed system provides more accurate marketing.
- Friends, family, co-workers, and other people who are important in one's life can know what one really wants for birthdays, Christmas, and other holidays.

Users will be helped to make better purchase decisions.
Users will know what people really think about the things the user wears.
Clients can find out what people think about their products and correct mistakes early.
Users will be able to list items that they will wear at an event to ensure there is no one else wearing it (hidden option).
A person will be able to stop reselling or marketing the same product to the same person.

It is to be understood that the Virtual Closet example explained above is just one of the limitless examples of different applications that can be created based on the present inventive concept.

Another example is described to demonstrate that it is possible to apply the present concept to almost every industry, service, or commercial concept. This example is called the VIRTUAL GARAGE. It is an online garage system that acquires new and inventive features through its connection with social networking systems. The idea resides on a social networking website that gives the user real time data on vehicles in individual's garages, vehicles they have owned in the past, and dealerships around the world.

The Virtual Garage system allows users to share, trade, sell, buy, donate, and even offer suggestions/feedback on any type of vehicles around the world. Every user may post the make, model, color, year, and specification of the vehicle he/she owns and/or vehicles or services in which they may be interested.

However, the system is not intended to be used just by individuals but by businesses and marketers as well. Vehicle dealers may also sell, market, manage, and learn more about their vehicles, customer satisfaction ratings, customer feedback, as well as collect, customize, sell and purchase vehicles. The idea is combining social networking, customer relationship management, inventory control systems, e-commerce, and software as a service related to any type of vehicles and vehicles-related services.

The basic functionality of the Virtual Garage system is based on the following principles:
  Vehicles may be listed specifying the changes added (e.g. additional lights, spoilers, grills, sports kits, CD/DVD player, TVs, or other accessories).
  Customers can get messages on when a vehicle drops to a desired price or a percentage of a price.
  Companies can modify vehicles and items to meet customer's interest.
  Real time details about vehicle usage.
  Real-time support with video chat and more (chat about products and functionality).
  Lot navigation system (augmented reality and mix reality), locate vehicle without the aid of a sales representative.
  Give a user real-time updates (recalls, oil change discounts, new release).
  Compare and contrast all vehicles in one place.
  A user can put the vehicle on a personal wish list where friends can donate money towards the purchase.
  See who else, such as celebrities or publicly known individuals, owns the same vehicle and what they modified.
  See how much the user paid paid for their car or accessories.
  Real-time vehicle reporting services, such as CAR FAX® may be incorporated in the system.
  360 degree view of a vehicle (virtual tour, pictures, mix reality, augmented reality)
  How many people own this vehicle worldwide and vehicle history may be included in the system.
  How many vehicles have been made of a make, year, and model.
  Previous owners' reviews (on previous model as well).
  Which celebrities own this vehicle.
  See commercials/advertisements for the vehicle.
  See rebates, discounts, promotions.
  Consult with experts.
  See complete inventory (around the world, new and used).
  Links to articles/news reports on the vehicle.
  List of movies and shows in which the vehicle was displayed.
  Price variance (Lowest-Highest).
  Out the door price (based on location, tax, specification, quantity or other factor).
  Modify the vehicle online (color, rims, spoiler, or other added accessories or modifications).
  Rent the vehicle (designates which companies and where it is available).
  Take a full tour of car and its features via mix reality.
  How to do it yourself videos and documents including interactive user guides.
  Companies can see who owns what vehicle and where the vehicles are located.
  Companies see how many vehicles they have and their specs.
  Companies can modify price and inventory.

Another example of the present invention may be called "VIRTUAL KITCHEN". It is a portion of the website that provides real time data on kitchen items and food in an individual's kitchens and in restaurants around the world. This will be a place where people can share, trade, sell, buy, donate, and even offer suggestions and feedback on whatever is food (cooking) related. Customers will be able to post their recipes, pots, pans, appliances, groceries, visited restaurants and food they are interested in. On the back end it will be a place for companies to sell, market, manage, and learn more about their products and the people that buy, eat, cook, prepare, use and write about. The idea is combining social networking, customer relationship management, inventory control systems, e-commerce, software as a service and the concept of having a virtual kitchen or restaurant. Features of the functionality of the website include, but are not limited to:
  Know what is missing in a user's kitchen.
  If a user doesn't have items to make a meal the system tells them where to go that has the item prepared, or where missing ingredients are located or sold.
  Inventory of grocery stores.
  Inventory of a user's refrigerator and full kitchen.
  What guests have in their kitchen (great during holidays, ask to bring over).
  Real time Virtual Grocery store (what food items they have and don't have stocked).
  Search by pictures, words, ingredients, food categories or other characteristics.
  Send message on what to buy to prepare for weather changes (hurricane, snow, or other severe weather situation).
  What appliances do chefs, celebrities and friends use (appliances, knives, cookware).
  How to make dishes via recipe tutorials by chefs, customers, companies, and restaurants.
  Who ate what, where and when.
  Who is currently at a restaurant or grocery store.
  Scan items to see where the nearest location is selling it.

Consult with experts on your diet and cooking methods and tools.

Give away food to organizations before food spoils or expires.

Write reviews on meals you ate at a restaurant (or a friend's house).

Watch how your meals are prepared from a phone while at the restaurant.

Companies can see what customers normally eat.

Companies can see when customers are low on a particular product (send coupons).

Receive referrals based on your interest and where your friends have recently eaten.

Offer suggestions where to eat on special occasions.

Track food allergies to remove those food items from restaurant menus and provide alerts of the allergies to the user's friends and family.

Another embodiment of the present invention may be called CEO (Centralized E-commerce Overhaul) and is a system for buying, selling, and marketing that mines the data in each transaction for various industries. The users (consumers, businesses, and marketers) will be able to refer to collected, received or otherwise gathered e-commerce data in real-time via the cloud (over the Internet). That data (images, stats, specs, purchases, receipts, details of products, consumer demography, inventory, 3D models, augmented reality graphics, depth data etc.) can then be used for more effective buying, selling, and advertising online and in brick and mortars as described herein. The user experience will consist of the features of customer relationship management, inventory system, software as a service while maintaining the norms of social networking and e-commerce. The overall user experience is enhanced by using technologies like context aware computing, augmented reality, pattern-based strategy, machine learning, algorithms, artificial intelligence, data mining, and the like. The main purpose of the system is to mine every step of a potential purchase cycle in real-time, generate data to enhance customer experience relating to the potential purchase, and allow users to refer back to that data at anytime and anywhere. E-commerce data will be now stored and tracked electronically via the Internet ("Cloud") whether it was done online or in a brick and mortar establishment. To help illustrate the concept some of the functions are listed below:

Users (i.e. waiters) are able to know which medications a user (i.e. consumer) bought so servers know what food or drinks to and/or not to offer that person (based on the person's condition).

Users are able to know what another user is allergic to based on data posted or past purchases so the waiter does not give it to the user by a mistake. Or it can be removed from an electronic menu.

The ingredients of every food item are stored so that the items and ingredients can be referenced by all users.

The ability to search and exclude items from the virtual aisles based on materials, ingredients, brand, etc.

Users are able to manage the things they buy, bought, and will buy from anywhere in the world.

Users are able to know if they own that item or if that items matches or fits the specs and is compatible with the items they previously purchased (clothes, electronics, etc).

The system will keep track of all the websites, retails stores, restaurants a user visited for the convenience of the user and the user can decide to share that information with the businesses and marketers.

Know what celebrities and other public figures buy (clothing and electronics to cars and houses, even items seen in movies).

Customers can buy items while physically in the store without actually walking around with a shopping cart full of what they want to purchase. They can easily scan the items as they shop and have their virtual shopping cart shipped to their house. The requirement of talking or waiting in line at a register may not be required. Checkout may be done via their mobile device or a device provided by the retailer. However, if they want to leave with the items that day, they can have an employee review what is in their virtual shopping cart vs. their physical shopping cart and check out at that moment. Registration in the e-commerce system may not be required. This process is also available via the Internet where the customers can pick up items that were placed in a physical shopping cart based on what they did virtually.

Sign up for a registry across several companies and people can apply payments towards an overall amount for crowdfunding a specific item.

A user may not need to visit several stores to find and pay for what they need.

Businesses can see exactly what customers own and offer suggestions on what to buy.

Businesses will now be able to effectively execute a just-in-time inventory system.

Registers and tellers may not be required. Establishment staff may roam the stores and use mobile devices to process payments.

Third party companies that allow users to monitor what is going on with a product or brand on several sites may not be required. A person can use a system where customers come to make specific comments about the establishment's product or brand.

Targeted marketing to the specific people who are actually purchasing a business' product is an exemplary feature.

A user can dock their phone at a restaurant. The user can then order and the user's identity and table location are automatically known.

Give consumers the option to sell items for a business and let them know how many they have to sell to get an item free or be compensated.

Customers can input when they disposed of an item and the mode of disposal (i.e. discarded, sold, or donated). This data can be tracked. In some instances, disposal of a product may be automatically determined via a data tag embedded in the product.

Each comment or information that businesses and consumers provide will have a specific location for inputting and tracking.

Know who walks in and out of an establishment and what they looked at or what they were looking for and offer incentives that would encourage consumer participation.

Give a restaurant a user's approximate time of arrival via Global Positioning System so the restaurant can know when to sit you. If the user doesn't allow restaurants access to location information, the manager will make an executive decision on how many people the restaurant can sit before the user arrives. A menu may not be required to check in via phone or mobile devices and checking in may be automatically executed.

Alarms only sound when an item not purchased goes through the metal detector. It will automatically know if the item was paid for or not and will eliminate embarrassing situations for both the buyer and seller.

Credit card, store value, and loyalty cards, coupons will now be in CEO, via the cloud.

If the buyer was or was not happy about a product the seller can trigger some emotions to either change the attitude towards the brand or product or capitalize on it.

The system is a buying portal for the Internet that a user can also use in a physical store.

Catch thieves by tracking who owns products and where the products are located.

Clients are allowed to determine the scope of information they want to share or release.

Data can be sold to third party vendors like insurance companies (life, house, car, etc.)

Celebrities' pages can be viewed to know what products they buy (clothes, electronics, house items, etc.)

Create a get to know you better page for business and other consumers.

Keep track of changes in a person's physique such as weight, size, or the person's change of interests and tastes.

What size of a specific brand fits a user the best thus, no need to call a spouse or check. A user can easily use a personal mobile device or one provided by the store and accesses the data via the Internet.

Take a picture of what the user is wearing to store it in the website (e.g. via a standard smart phone camera or a depth camera that three-dimensionally models real-world environments).

Find customers based on what they purchased in the past.

Data relating to product consumption can be sold including how long it takes an item to get to a landfill (thrown away or disposed).

The first system or method allows users to manage data about their purchases and purchase cycle data.

Make money selling data to third party companies (insurance, researchers, schools, etc.).

Manage the items a user purchases from anywhere in the world.

A user can manage what they are ordering from a menu, what they ordered in the past, and details about the ingredients. Click on the words to see what the item is. It will also keep track of foods to which the user is allergic to and/or disliked.

The user's in-store Shopping Cart is populated online. This will allow users to have others pay for their items remotely, or to keep track of the things they are interested in. Items can be scanned with a mobile device as the user puts them in the cart. Alternately, the user can logon to the cart and it will automatically scan the items.

Provides the ability to match exact colors, specs, etc, from past purchases

Provides the ability to search by cheapest item, expensive items, quality, popularity, rating, etc.

Automatically login when a user walks into a physical store and provide discounts Send messages to everybody that owns a product for the purpose of troubleshooting, recalls, opinions, reviews, feedback prior to purchase.

Get points for helping other people out, reviews, tech support, etc.

Use the website of the system as a credit card or wallet. All users may have to create an account.

Use computing tablets as cash registers.

A user can share what they purchased with others.

Order from multiple places but ship all at once (an issue when ordering from places like AMAZON® and EBAY®).

Tools to test demand based on an increase or decrease in price. A live website to test demand in real-time.

Users can sign in at a barbershop and get an estimated time they will be seated. They can leave and receive notification when they are next in line or even pay to skip someone who is next in line. For example, the system may keep track of a rate of check outs (check outs per time) and calculate how long a wait time is for a particular consumer based on the consumer's position in the waiting line.

Upload the date a user resold (trashed, gave away, etc.) a product whether it was junk or a great product and learn the real life span of a product.

See how each store is doing individually, by region, by state, or by city. Find out what is working and why. (e.g., in sales, traffic, employees, marketing, demand vs. supply, etc.)

A user gets their own page to brag about the items they have purchased.

Tool bar and browser to store data from purchases made from other websites. The consumer can receive discounts or compensation for this option The user can dock their phone into a shopping cart or use other means to synchronize in real time.

Add special dates (birthdays, anniversaries, etc.) so a user can always remember to buy gifts.

Turn the idea that people have your information into a good or favorable concept.

A single shopping portal for shopping online and offline.

A completely remodeled infrastructure of buying, selling, and advertising.

Remember all the items that a user preselected at home once they get to a store and find the items with a Global Positioning System like function.

Keep track of all items a user has put in a virtual shopping cart so there is no need to do the work twice.

Imagine being able to reference a particular item that you purchased years ago by a click of a button.

Imagine being able to reference what the user wore, when, with whom, how, where and what they were doing.

Carrying store loyalty cards may not be required.

Thumbs up, sideways fist, thumbs down buttons are operative to indicate likes and dislikes.

Online layaway (hold item until a user completes payment).

Let people know when a user is shopping in real time.

An online registry may be included that includes e-commerce data relating to purchases and products or product profiles.

People can make partial payments toward items for the user.

One registry may be included to span across multiple stores.

Gives the user detailed information on products.

Tracks expiration dates on food.

Provides recalls for all items currently owned.

Provides updates for all items currently owned.

Transfer funds to other people's accounts via the Internet or to the store.

Find a way to offer a debit card based on user information and product purchases.

Barcodes in stores give out signals and may be detected for locating and identifying an item or product.

Locating and scanning items may be automatically done.

When a user receives an email the system adds or pulls contact information and interaction history.

A user can make phone calls from the website (calls are saved in the notes (i.e. date, time, and subject).

Compare and/or contrast items in one place.

Satisfying the demand for information.

Give reviews that actually get used.

Real-time support with video chat about products and website may be included.

Commercials can be posted and customers can click through to educate themselves on products.

The Centralized E-commerce Overhaul system helps the three primary users, consumers, businesses, and marketers. In some embodiments, marketers and businesses may share a user account type generally referred to herein as a business user account.

THE BUSINESSES. Businesses are currently using social networking websites to reach their target audiences. Then, they pay third party companies to dissect data from those websites and turn it into useable information. When they receive this information, they turn around and make some changes to their target audience, products offered, pricing structure, or completely head in a different direction. These changes have to be uploaded to the company's website or in some case to another third party vendor. The issues with this scenario is that the data is usually time sensitive, the information can be diluted after going through so many vendors, and the high cost of third party data.

The Centralized E-commerce Overhaul system solves these problems by combining software that manages their inventory (location base), sales, customers, reviews, feedback and other data in real-time. The system also implements formals to dissect the data to show you what to do next when selling to customers and who they really are. This allows them to ultimately make better product development and pricing decisions. The ultimate goal is to help them satisfy customers.

THE CONSUMERS. In today's world product information and locations to purchase the product are everywhere. While one may think that is advantageous, it is actually part of the problem. There is not a central place to compare and contrast, read a review, check pricing, see where it is located, and make that purchase all at once. What if someone was looking for a barbershop and was new to a town? How would they know where to go, what is the current wait time, how many barbers are there now, are the barbers any good, how much for a "clean" haircut, what days do they give out free haircuts or can I get a free hair cut on my birthday? The answer is that they would have to go to several websites, call up several establishments, ask countless neighbors and see if they get lucky by driving to one or two (sometimes more) of them.

Centralized E-commerce Overhaul system aims to solve these problems by giving the consumer access to manage purchases, companies, products of interest, services of interest, promotions, reviews, comments, inventories of companies based on location and other functions. They even have the ability to confirm that a new item will work or match with an item they previously purchased, receive discounts based on previous purchases or do a walkthrough of the store virtually. The benefits of this tool are endless. There are many types of consumers and they can be usually classified by their age, sex, income, state of mind, stage of life, marital status, celebrity/public figure status, etc. and these (everybody that can use a computer) are the consumers that will use CEO daily.

THE MARKETERS: Marketing and advertising are losing effectiveness across the board and not just in online mediums. To make it worse, many marketing firms go after social networking and e-commerce strategies without even knowing the "who, what, when, where and how" of their customers. And customers don't trust, need or want their "information" and you can't force them to accept it (watch, read or listen and in some instances taste or feel). Businesses and the third party companies they hire have not grasped the true benefits of the information they can gather from social media and e-commerce websites. This also explains why they don't know how to balance the data with internal decisions for increasing performance.

The CEO system solves these problems by giving the marketer access to analyze data from pie charts, bar graphs, line graphs, stats, etc. The statistics include the mean, median, modes, ranges, average, maximums, minimums, etc. for all relevant data that is on the website. The system does these calculations in real-time and saves all previous calculations for easy projections or predictions. An internal analyst helps a user dissect the data. The information and data that was once scattered now resides in one location. The goal is to encourage marketers or advertisers to adapt to a trust base information approach. This means that the same data that was gathered will be used to present information to their client and ultimate consumers in a targeted manner. For example, marketers may discover that their product is not valuable to one niche, but is valuable to another.

Turning now to FIG. 7, a process 700 for conducting integrated electronic commerce utilizing the integrated electronic commerce system 600 of FIG. 6 is shown illustrating the matching of one of consumers 630, 640 with a merchant 660, 670, 680 for conducting at least one transaction of electronic commerce therebetween. In step 702 the process starts wherein a user establishes access to the electronic commerce social network host central office 610 and is queried in block 704 if the user is a new member. If the user is a new member, they are directed to block 706 to create an account and in block 708 they create a user profile by answering a series of questions to establish personal and business data information which can be utilized by system 600 during the integrated electronic commerce process 700. Once the user's account has been created, the process directs the user to block 710 to login to the website. If the user in block 704 is identified as being a present user, the process immediately directs the user to block 710 to login to the website by a known method such as by providing an account name and password.

In block 712 the process determines from the account data entered in block 706 whether the user is a consumer 630, 640. If the user is a consumer, the consumer in block 714 selects, such as from a menu, a subject category the user desires address in the process. The subject category can be represented as the virtual closet, virtual garage, virtual kitchen discussed above, or such other virtual rooms or functions enabled by the computer 612 executing the instruction set residing on memory 614 at the electronic commerce social network host central office 610. Once a subject category, such as the virtual closet, has been selected the user is queried in block 716 to enter an inventory of all the user's articles of clothing owned by the user during the user's first visit to the subject category or to modify a prior inventory with any changes the user may have made to the user's wardrobe since the user's last visit to the category. Once the user has determined that the inventory of the user's virtual wardrobe is current and matches the user's physical wardrobe, the user releases the wardrobe data for use in block 718. The data entry process can be repeated for a plurality of subject categories to provide for use in block 718 a complete inventory of items owned by the user.

In block 720 the user, such as consumer 630, enters a query for a product or service the user wishes to purchase, rent, lease, or obtain information relative thereto and in block 722 the user conducts the electronic commerce with a business, such as one of merchants 660, 670, 680. The electronic commerce engaged by the user can range across a spectrum of interactions with merchants 660, 670, 680. The user can initiate a search for a type of product, such as a shirt, or the user can initiate a search for a specific shirt from a specific merchant 670.

Also contemplated in the electronic commerce are responses to advertisements or invitations to make purchases which have been directly sent to the user by marketer 690 who has determined from gathered information from the user's data base, virtual closet inventory, and from information relating to specific merchants 660, 670, 680 that the user, consumer 630, has a high probability to be inclined to engage in purchasing a specific product, such as an item of clothing offered by a specific merchant 660, 670, 680. Once the electronic commerce has been completed, the process ends at block 748.

If, in block 712 the process determines from the account data previously entered in block 706 that the user is not a consumer 630, 640, the process advances to block 724 where the process determines from the account data previously entered in block 706 whether the user is a business. If the user is a business such as merchant 660, the merchant 660 in block 726 enters specifications for products or services that the merchant 660 offers to the public for purchase or consumption. For example, the merchant 660 can enter the category of items carried, such as clothing, further identifying the items by more specific descriptions such as shirt, size, color, design, brand, material or other descriptive terms which are searchable through execution of the instruction set on memory 614 by the computer 612 of host 610. In subsequent visits, the merchant 660 can update the inventory of products and services offered.

In block 728 the merchant 660 then enters data that the merchant 660 believes is representative of the ideal consumer match for the products or services offered by the merchant 660. Once the merchant 660 is satisfied that the inventory of merchandise or services is current and matches the merchant's physical inventory, the merchant 660 releases the product and services data for use in block 730.

In block 732, the merchant 660 can begin to query potential customers, such as consumers 630, 640, that merchant 660 determines from consumer data released for use in block 718 are likely to engage in purchases of products offered for sale by merchant 660. In block 734, merchant 660 engages in electronic commerce with the consumer 630 when consumer 630 queries merchant 660 about a specific product or range of products. Merchant 660, having access to the user's data released in block 718 is able to narrow the items, services offered to match the needs and tastes of the user as determined from the user data released in block 718. Once the electronic commerce with consumer 630 has been completed the process ends in block 748.

If in block 724 the process determines from the account data previously entered in block 706 that the user is not a business such as merchants 660, 670, 680, the process advances to block 736 where the process determines from the account data previously entered whether the user is a marketer 690. If the user is not a marketer 690, the process can continue to check for additional categories of users. However, for the sake of brevity and simplicity the current process has been limited to consumers, businesses, and marketers and such limitation is not intended to be limiting to the number of potential user categories in its implementation. Two additional categories that are used to show how diverse the categories can be are public and researcher categories. The public can be a movie director, celebrity agent, news director, politician publicist, etc., that can input data about when and where a certain item in the system was worn, used, purchased, and the like, in movies, conference, vacation, music videos, news reports, magazines, newspaper, and other mediums or places. The researcher user category can access all the data to analyze cultures, demography, psychographic, geography, etc., to estimate increases, decreases, and changes in consumers, businesses, marketers, products and services. If the user is a marketer such as marketer 690, the marketer 690 in block 738 defines and enters the marketing parameters, such as categories of products or services, to which its marketing activities are directed. In block 740, the marketer 690 enters characteristics of the type of consumer to which the marketing activity is to be directed.

In block 742, the marketer 690 acquires from the data stored on memory 614 at host 610 user and product information released by the consumers 730, 740 in block 718 and the merchants 660, 670, 680 in block 730. In block 742 the marketer 690 further processes and integrates the data acquired to tailor the marketing message for a subject product offered by a merchant 660, 670, 680 who has engaged the marketer 690 for marketing services and to match that marketing message to those specific consumers 630, 640 who are most likely to desire and to purchase the product or services offered by the merchant 660, 670, 680. In block 744 the marketing message is delivered to the target audience. The marketing message can be in the form of strategically placed electronic advertisements for display on consumer's terminal 632, 642 or portable electronic device 638, or as an email or text message addressed to the specific consumer 630, 640. The marketing message can also include a coupon to incentivize the consumer to purchase the subject product or service. Once the marketing message has been delivered to the consumers 630, 640 the process ends at block 748.

The instruction set stored in memory 614 and executable by computer 612 can also, as suggested by dashed line 746, integrate the data released by consumers 630, 640 in block 718, merchants 660, 670, 680 in block 730, and the marketing messages developed by marketer 690 in block 742 and match particular consumers 630, 640 with particular merchants 660, 670, 680 without being specifically queried by a user. In this manner, the matching of consumers with merchants is a unique function of the instruction set executed by computer 612 at host 610.

As a result of the process of FIG. 7, a wide range of data related to purchases and marketing is generated. The acquisition and types of data generated and saved for use is most easily described in the following table.

| DATA STORED IN EVERY STEP OF EACH PURCHASE PROCESS | | | |
| --- | --- | --- | --- |
| | Consumer | Marketer | Business |
| AWARENESS | RECOGNIZE A NEED | SEND UPDATES BASED ON PASSED | CREATE A PRODUCT AND ADD TO SYSTEM |

DATA STORED IN EVERY STEP OF EACH PURCHASE PROCESS

|  | Consumer | Marketer | Business |
|---|---|---|---|
| SEARCH | BROWSE SITE | PURCHASES MARKET RELEVANT PRODUCTS | SEND USEFUL INFORMATION ABOUT PRODUCTS, SERVICE OR INVENTORY |
| EVALUATION | READ REVIEWS, CHECK WITH FRIENDS, VISIT A STORE, ETC. | INVITE THE CONSUMER TO A STORE, TO WATCH A COMMERCIAL, TAKE A TOUR, TEST DRIVE, ETC. | SHOW HOW PRODUCT IS BETTER THAN COMPETITOR'S PRODUCT |
| PURCHASE | DETAILED INFORMATION ABOUT THE PRODUCT OR SERVICE | OFFER PROMOTION OR DISCOUNTS ON OTHER PRODUCTS TO ADD VALUE | DETAIL INFORMATION ABOUT THE CONSUMER |
| POST-PURCHASE | POST REVIEWS ABOUT PRODUCTS, TELL FRIENDS, BUY ACCESSORIES, ETC. | ANALYZE CONSUMER BEHAVIOR | SEND TIPS ABOUT PRODUCT |

Use of the executable instruction set requires a graphical user interface to which the user can respond with appropriate input via a keyboard or pointing device integrated with network terminals 632, 642, 662, 672, 682 and 692 (FIG. 6). The graphical user interface 800 as illustrated in FIGS. 8-11 can include a dashboard or home page 802 that includes a plurality of icons, which the user may select to navigate within the instruction set. As most fully exemplified in FIG. 8, the home page 802 can include a date and time indicator 804 for the convenience of the user as well as display mode indicators 806 allowing the user to configure home page 802 to correspond to the user's personal tastes. Home page 802 can also include one or more iconic avatars 808 indicating which of the user's saved or designated friends and acquaintances are currently shopping. A map 810 can be included to designate where each of the friends identified with iconic avatars 808 are currently located and shopping. The map 810 can also designate locations of interest 812 for convenient marking and location for the user. Home page 802 can also include a Watch List Area 814 to include items for potential purchase by the user. A Discount and Promotion Area 816 can be designated to display particular promotional and discount advertisements 818 for products and brands in which the user has designated a particular interest.

Figure 9:
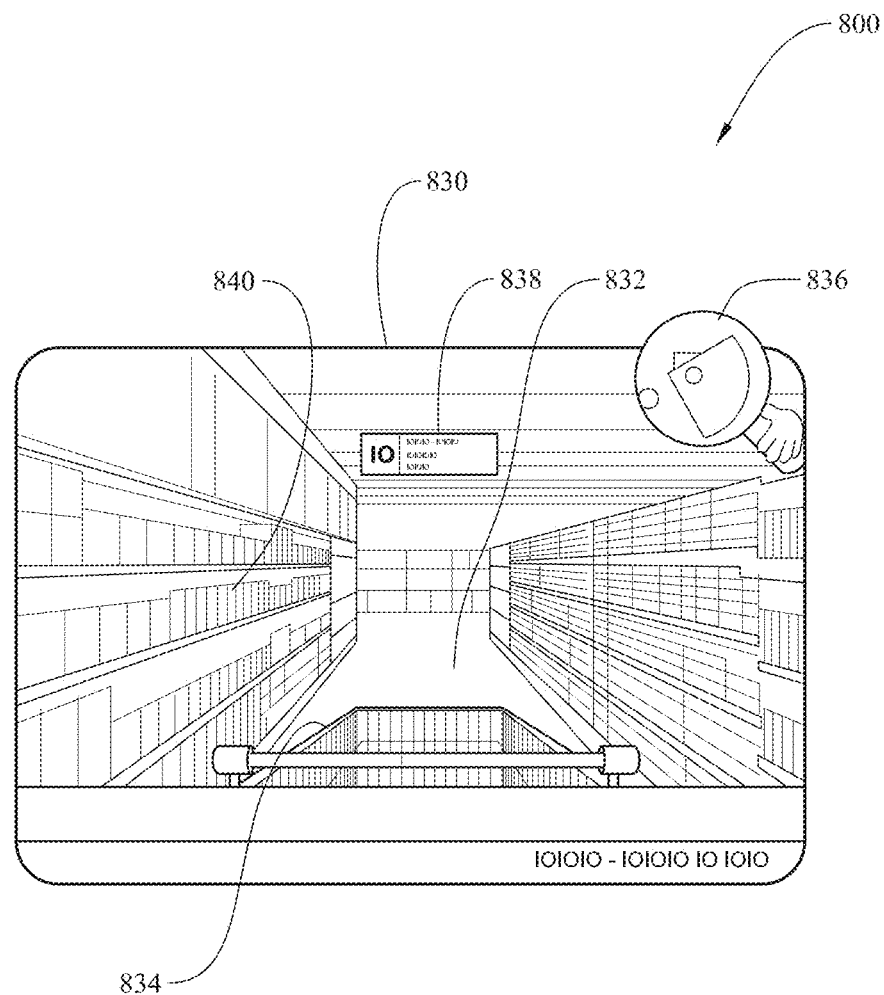
FIG. 9 presents an exemplary store aisle for electronic shopping in a super market graphical interface.
Figure 10:
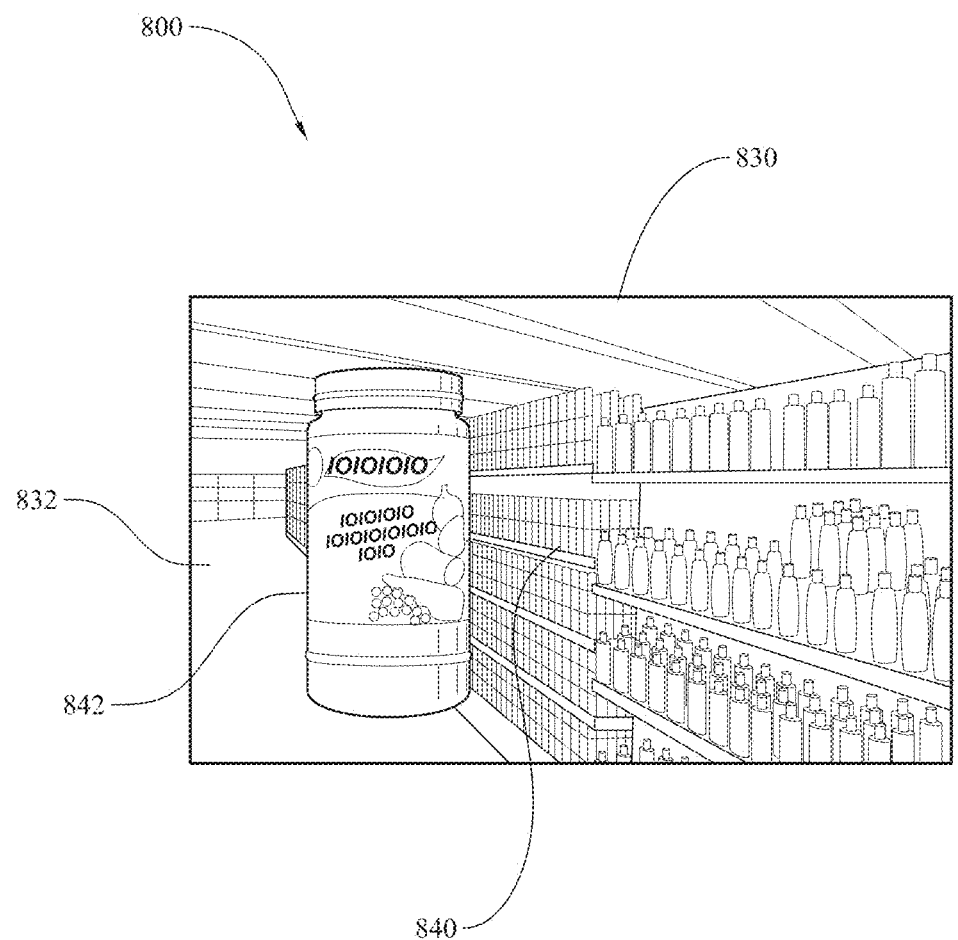
FIG. 10 presents a food item icon selected from the exemplary store aisle of FIG. 9.
Figure 11:
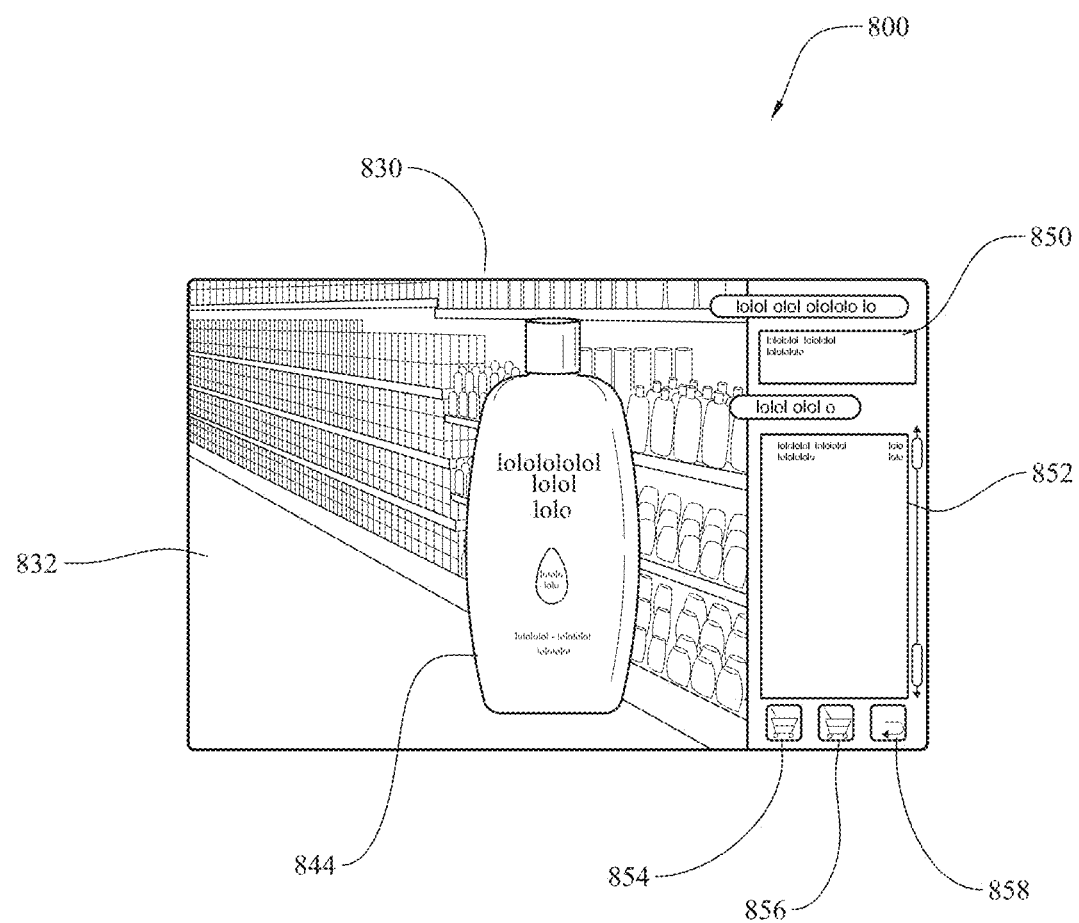
FIG. 11 presents a shopping cart inventory window as part of the exemplary store aisle of FIG. 9.

As illustrated in FIGS. 9-11, the user can perform online shopping through network terminals 632, 642, 662, 672, 682, and 692 while using the executable instruction set. A typical shopping page 830 is illustrated in FIG. 9 and is configured to appear as a typical aisle 832 in a super market. A shopping cart 834 is depicted for receiving item selected for purchase by the user. A magnifier 836 can be maneuvered by the user with the aid of the pointing device associated with network terminals 632, 642, 662, 672, 682 and 692 to more clearly view details such as the aisle sign 838 and shelved products 840.

Figure 8:
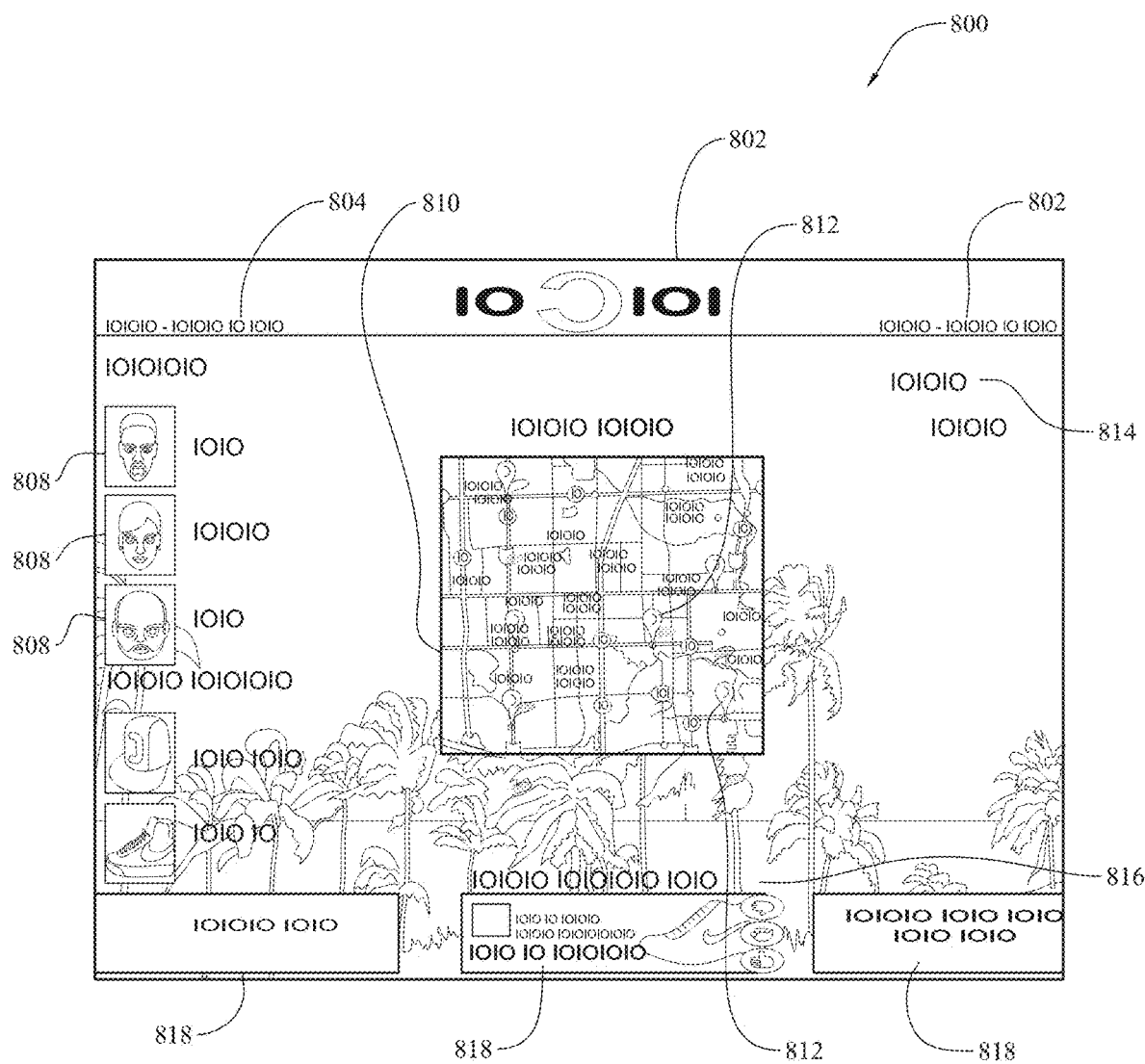
FIG. 8 presents a home page screen from an exemplary graphic user interface for executing the instruction set.

As shown in FIG. 10, the user has selected a food product 842 from the selection of shelved products 840 in the shopping aisle 832 for closer inspection. The food product 842 is shown in enlarged iconic form so that the user can read the labeling on the food product 842 to determine the size, quantity, ingredients, and nutritional values of the food item 842. If the user desires to purchase the item, a selection is made to place the item in the shopping cart 834 (FIG. 8).

The user continues shopping along aisle 832 selecting additional products for purchase such as baby product 844 as shown in FIG. 10. As a further aid to the user, additional information can be displayed on screen 830. A product description window 850 can display product descriptive information that is stored in the seller's data storage and associated with the product so that the information displayed in product description window 850 correlates to the product shown in enlarged iconic form such as baby product 844. A tabulation window 852 can display a comprehensive list of items in the shopping basket 834, quantities, individual prices, and cumulative totals of the cost of all items in shopping basket 834. Additional action icons can also be displayed such as an Add Item icon 854 which, when activated by the user, will place an item currently being viewed into shopping cart 834. In like manner, the user can highlight an item already in the shopping cart 834 and remove the item from the cart 834 by activating the Remove Item icon 856. When the user has completed the shopping task and wishes to complete the purchase, a Checkout icon 858 can be activated to commence the payment of the items in the shopping cart 834 and the instructions for delivery of the items.

Figure 12:
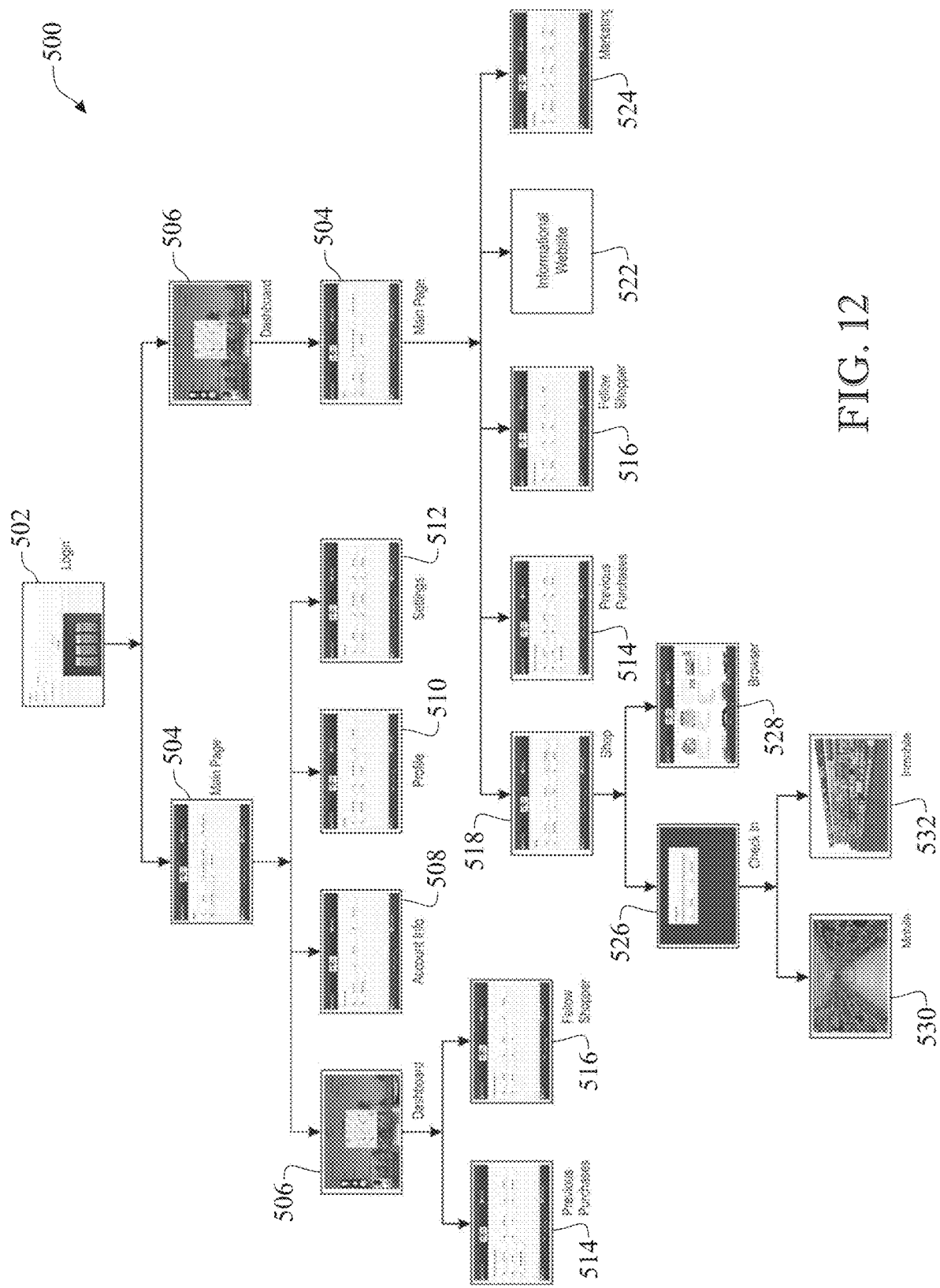
FIG. 12 presents a functional flow chart from an exemplary graphic user interface for interacting with the instruction set via the Internet.

As illustrated in FIG. 12, a functional flow chart 500 of representative screen displays is illustrated for interacting with the instruction set via an Internet interactive web site.

In Login screen 502 the user logs into the system thru a login process utilizing entry of a username and password. Customers have the option of clicking a sign up link if they are a first time user. If the customer does not remember their password they can click on a "forgot password" icon where they can answer questions to reset it. Another feature on the login screen is the ability to choose a "password shortcut". The password shortcut allows the user to enter a pin, combination, tactile buttons, pattern and other unique things to login. Using this method the customer does not have to enter a username or password. The website application automatically recognizes the customer based on the unique login and the device (IP, MAC address, GPS, etc.) being used.

Once the customer has logged into the web site, the customer is directed to the main page 504. The main page 504 has buttons allowing the customer to select a further functionality such as a Shop page 518, Previous Purchases page 514, a Fellow Shoppers page 516, an Information page 522, and a Marketing page 524. Each button will lead the customer to a new page allowing the customer to functionally interact with the web application in additional manners. Each selective page also includes a header and a footer that display additional buttons and features. The header has three buttons (not shown) linking to the Dashboard page 506, the Main Page 504 (click on the logo), and Settings page 512. The footer has two buttons (not shown) linking to a Profile Page 510 and Account Information Page 508. The footer also includes a search field (not shown) that can search the respective pages or the complete application (e.g. it can search the fellow shoppers alone or include the customer's previous purchases in the search).

When the customer selects the Shop icon from the Main page 504, the customer arrives at the Shop page 518. The Shop page 518 has buttons (not shown) to a Wish list, Registry, Upcoming Sales, Gifts list, Check-in, and Browser (not shown). The Wish list includes all the things that the customer one day wishes to own. The registry is a list of items the customer wishes to receive for a birthday, wedding, baby shower, etc., the customer wishes all fellow shoppers to know about. The customer can select items across all stores, brands, industries and companies. The Upcoming Sales selection is the list of items that fit the customer's buying habits, preferences and tastes that are about to go on sale. The Gift list selection includes items that the customer plans to buy for others. The Check-In button directs the customer to a Check-In page 526 and allows the customer to check-in to shop while walking through the store's virtual aisles at home (Immobile page 532) or permit the company to know that you walked into their physical store with a mobile device to shop (Mobile page 530). The browse button is the traditional way of shopping by directing the customer to a Browser page 528. The Browser page 528 permits the customer to browse the website and application and click on the items that the customer wants to buy.

The Previous Purchases button on the Main Page 504 directs the customer to the Previous Purchases page 514. The Previous Purchases page 514 has quick buttons directing viewing to the customer's last ten purchases, purchases by category, purchases by brand, purchases by store, purchase A-Z (full list in alphabetical order), pending purchases, and a button to manually add a purchase.

The Fellow Shoppers button on the Main Page 504 directs the customer to the Fellow Shoppers page 516. The Fellow Shoppers page 516 includes buttons that show the customer those people in the customer's network, the places they go, and the things they buy. Also, the customer will be able to see recent activity and find new shopping buddies.

The Information button on the Main Page 504 directs the customer to the Information Page 522. This page is for learning more information about the company, products, services, investing, the executive team, future plans, etc.

The Marketing button on the Main Page 504 directs the customer to the Marketing page 524. On the Marketing page 524 the customer is able to click buttons that lead to videos, images, audio, celebrities, events, and news about the products and services that the customer owns, is going to buy, and has an interest in. Some examples are commercials on television and radio, celebrity endorsements for products, tradeshows or events where someone of fame was using or wearing a product, etc.

The Settings button from the header of any page directs the customer to the Settings page 512. On the Settings page 512, the customer, has access to buttons to edit the display, personalization of the site, privacy, sound, location and security settings.

The Profile button from the footer on any page directs the customer to the Profile page 510. On the Profile page 510 the customer can find buttons to edit the customer's contact info, personal info, interest, metadata (data stored about the customer based on the data collected from the application), and take surveys.

The Account Information button from the footer on any page directs the customer to the Account Information page 508. On the Account Information page 508, the customer has the ability to access the customer's account balance, deposit money, make transfers to friends and family, and view the customer's full statement.

Accordingly, an e-commerce enhancing system is disclosed. The e-commerce enhancing system is invariably referred to herein as a centralized e-commerce overhaul or an integrated electronic commerce system. The above described central office may include, or may take form as a server. The above described merchants or merchant users may be invariably referred to herein as business users. A terminal described above may be a personal electronic computing device. Such a terminal may be a terminal end-user interface of a computing system. The memory storage described above is invariably referred to herein as a storage machine, and any processor described herein is invariably referred to as a logic machine. Further input methods described herein may be carried out via an input subsystem, and various communication methods may be carried out via a communication subsystem as described herein.

Figure 15:
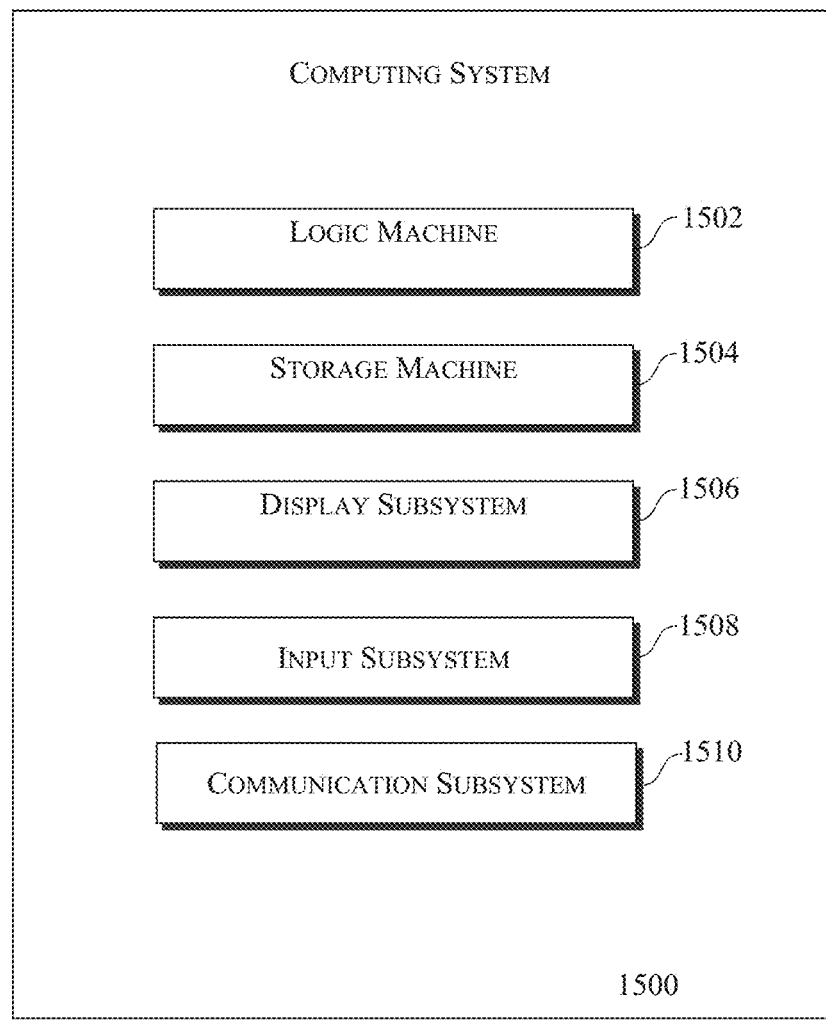
FIG. 15 schematically presents an exemplary computing system, in accordance with aspects of the present disclosure.

The e-commerce enhancing system includes one or more storage machines holding instructions executable by one or more logic machines to carry out or execute tasks described herein. For example the various computing devices described herein may include or may take form as a computing system such as computing system 1500 of FIG. 15. For example, computing system 1500 includes a logic machine 1502, a storage machine 1504, a display subsystem 1506, an input subsystem 1508, and a communication subsystem 1510. For example, the input subsystem may be configured to receive user input or depth data from a depth camera, or standard RGB pixel data from a standard smart phone camera.

The above described features may be provided as a result of these tasks being executed. It is to be understood that the above features are exemplary in nature and are not to limit the spirit or scope of the present disclosure.

Figure 14:
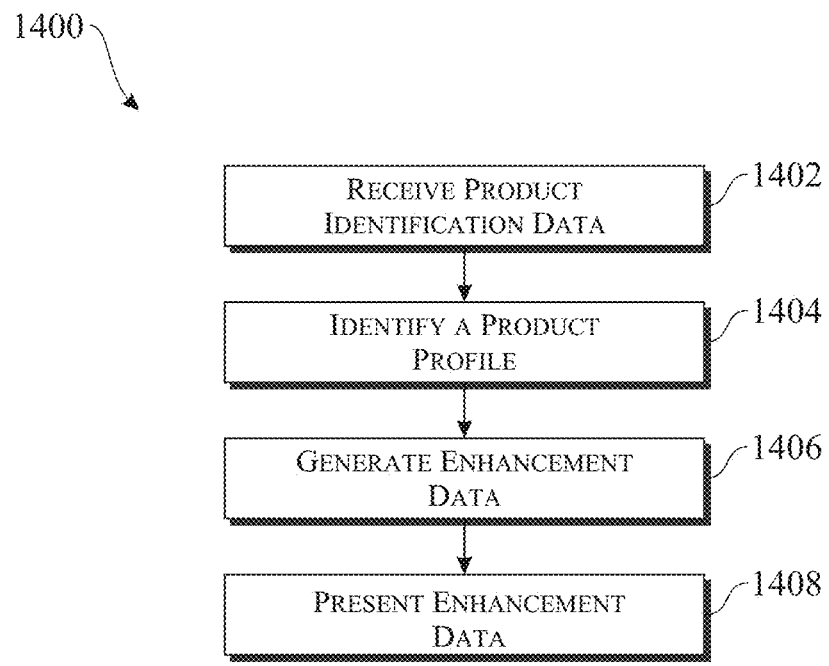
FIG. 14 schematically presents a method of displaying enhancement data to enhance an experience of a customer user, in accordance with aspects of the present disclosure.

The illustration of FIG. 14 shows a method of presenting enhancement data in accordance with the present disclosure. At step 1402, product identification data is received. For example, product identification data may be received at a personal computing device, and may relate to a potential e-commerce interest of a user. For example, a potential e-commerce interest may be one of the products and services described above. The product identification data may be received via a manual user input or via a data tag that is embedded into the potential e-commerce interest. The product identification data may be received automatically in response to detecting a potential e-commerce interest, and may include location data of a product. For example, the manual user input may indicate a particular product, or may include various user preferences for identifying a product. The user preferences may include parameters that indicate attributes of a desired product. The data tag may be a machine-readable data tag such as an RFID device or an NFC device, and the product identification data may originate from such a machine-readable tag. For example, the machine-readable data tag may take form as a physical electronic device, or a physical emitter or transmitter known in the art. It is to be understood that any appropriate data tag may be included to hold the product identification data or instructions to emit, send, or transfer the product identification data. The product identification data may be received automatically upon the system sensing or detecting the data tag, or may be received upon manual operation of the personal computing device. For example, a QR code or the like may be the data tag and a smart phone camera may be operated to capture the QR code and any contained data. The product identification data may include location data for locating the potential e-commerce interest on a map or a three-dimensional environment. For example, GPS data may be included that may be received and read or located by a GPS receiver. As such, the GPS data may be transmitted by a GPS transmitter. In some embodiments Wi-Fi signals or triangulation may be used to determine the location of a product. Other electromagnetic communications may be used such as infrared sensors and transmitters. For three-dimensionally locating the machine-readable data tag, the location data may be matched in a three-dimensional model of a real-world environment in which the machine-readable data tag is located.

At step 1404, a product profile is identified. For example, the system may include a product identifier to identify a product profile of a plurality of archived product profiles. The archived product profiles may be stored or archived in a product profile archive. For example, the product profiles may include three-dimensional virtual models or products or three-dimensionally modeled virtual environments or objects. The product profile may be identified by matching the product identification data with an appropriate product profile of the archived product profiles. For example, the archived product profiles may include data relating to various products such as product specifications, price, location, department, etc. and the product identification data may also include this information. For example, a bowling ball product may have an embedded machine-readable data tag that provides product identification data that indicates that the bowling ball (potential e-commerce shopping interest) product has a particular serial number. The serial number may be cross-checked with the product profile archive to pull an appropriate product profile relating to the bowling ball, and as such, a product profile is identified that matches the product identification data.

Next, at step 1406, enhancement data is generated (i.e. e-commerce enhancement data). The enhancement data is generated and configured to enhance an e-commerce or shopping experience relating to a potential e-commerce interest. For example, the enhancement data may include information or data to enhance a shopping or e-commerce experience of a user relating to a potential e-commerce interest. The enhancement data may be generated according to the product identification data and the identified product profile. For example, product identification data may include a serial number that matches a particular product profile and the enhancement data may be generated to recommend a similar product profile to the identified product profile. In some embodiments, the enhancement data may be generated with respect to, according to, or based on marketing data, product identification data, and a product profile.

At step 1408, the enhancement data is presented to a user. For example, the enhancement data may include data relating to a similar product to an identified product profile, and the data may be visually presented at a personal computing device of a user. For example, the enhancement data may be presented as a pop up recommendation, or via a selectable icon or virtual button. The enhancement data may be presented via or through a display or display subsystem of a personal computing device of a user. The enhancement data may include a targeted marketing message to market a product, product profile, or potential e-commerce interest. For example, the targeted marketing message may include content mentioned above for marketing an item. The targeted marketing message may be generated according to a potential e-commerce interest, marketing data, and/or a personal inventory of a user.

The e-commerce enhancing system may be configured to receive a depth map of a real-world environment and present the enhancement data to a user by overlaying an augmented reality rendering of the e-commerce enhancement data on the depth map. For example, a depth map of a real-world physical store or a real-world closet may be received from a depth camera that is configured to three-dimensionally model a real-world environment. For example, modulated light may be projected to illuminate a real-world scene and a phase difference of reflected light may be received to determine a depth or distance of objects to form depth data or a depth map. Alternatively stereoscopic projections may be included to determine or generate a depth map. For example, structured infrared illumination patterns may be projected onto a real-world environment, and the infrared illumination may be reflected and received at an infrared camera receiver for determining a spacing between the structured infrared illumination. The spacing difference between the illuminated and reflected light may be used to determine an object's distance from a viewpoint. In some embodiments, a depth map may be generated as a collection of voxels or volumetric pixels. Time-of-flight cameras may be included to generate depth maps. Depth cameras are becoming more useful in modem day electronics because they provide three-dimensional models of real physical objects even if the physical objects are moving parallel to an optical axis of a three-dimensional modeling device such as a depth camera. In some embodiments a coordinate system may be included to locate and project objects in three-dimensional virtual environments or real-world environments. It is to be understood that any appropriate method may be used to three-dimensionally model a real-world environment to generate a depth map. As such, graphics may be rendered on such a depth map and such graphics may appear as existing in a real-world environment (when viewed by a user through a display subsystem of a personal computing device). For example, the system may three-dimensionally model a real-world product via a depth camera to form a product depth map of the real-world product and present e-commerce enhancement data and the product depth map in a three-dimensional virtual environment. The enhancement data may include a three dimensional model of an identified product profile that may be rendered as an augmented reality graphic. As another example, text may be rendered on surfaces of a real-world environment such that the text appears to be painted on the real-world environment. Alternatively, text or graphics may appear to pop up from real-world products. For example, the machine-readable data tags may be configured to send location data such that the location data may be processed or used to appropriately overlay augmented reality graphics on, near, or in a vicinity of a potential e-commerce interest. For example, location data may be received at a locator to locate a potential e-commerce interest in a real-world e-commerce environment such that augmented reality renderings are overlayable at a location of the potential e-commerce interest to direct a user to the potential e-commerce interest. As such, the product identification data may originate from the machine-readable data tag. As another example, real-world items may be detected and highlighted via an augmented reality highlighting graphic or arrow. As such, the e-commerce enhancing system may present e-commerce enhancement data to direct a user to a potential e-commerce interest or product based on the product profile, product identification data, or user preferences. In some embodiments, a user's body part may be modeled via a depth camera to generate a three-dimensional virtual model of that body part. Such a model of a real body part may be used to overlay augmented reality graphics on that body part such that a user may virtually try on clothing or items as desired without requiring to physically contact a potential shopping interest. As another example, a depth map of a product may be generated via a depth camera, and the depth map may be overlaid on a virtual environment such as a virtual closet (i.e. virtual inventory). A user may interact with any of the products, items, or object presented as an augmented reality or virtual graphic. In some embodiments, the above described augmented-reality functionality may apply to purely virtual embodiments, such as the virtual shopping embodiment described above (i.e. virtual shopping isle).

The e-commerce enhancing system may be configured to receive an inventory user input for modifying a personal inventory, the personal inventory being configured to hold and display user-selected product profiles. Further, the e-commerce enhancing system may be configured to present the personal inventory to a user in a three-dimensional virtual space via a display subsystem of a personal computing device. For example, the personal inventory may include various items that have been entered via a manual or automatic input. For example, an inventory item may be entered in to the personal inventory in response to a user taking a photo of a machine-readable tag that is embedded on a product, or in some instances, a depth map of a product may be entered into the personal inventory for being displayed in a three dimensional environment. For example, the virtual space may include a virtual closet that is either a customizable fictional three dimensional model or that includes a depth map of a real-world environment. In some embodiments, a user may simply select product profiles that exist in the product profile archive to be displayed and included in the personal inventory. In some embodiments, the personal inventory is configured to be viewed by a plurality of authorized users or individual authorized users (i.e. business users or consumer users).

In some embodiments, the e-commerce enhancing system is configured to receive product identification data from (or at) a first computing device relating to a potential e-commerce interest of a consumer user, and at a second computing device, receive one or more product profiles from a business user. The one or more product profiles may include marketing data for marketing the one or more product profiles to other users (i.e. consumer users) as described above. As such, the marketing data may also be included when identifying a product profile at step 1404 and when generating enhancement data at step 1406. For example, business users may input product specifications and target users when entering a particular product profile into the system, and the enhancement data generator may take the target user into account. As such, at the enhancement data generator, the enhancement data is generated based on both the product profile and the marketing data.

Figure 13:
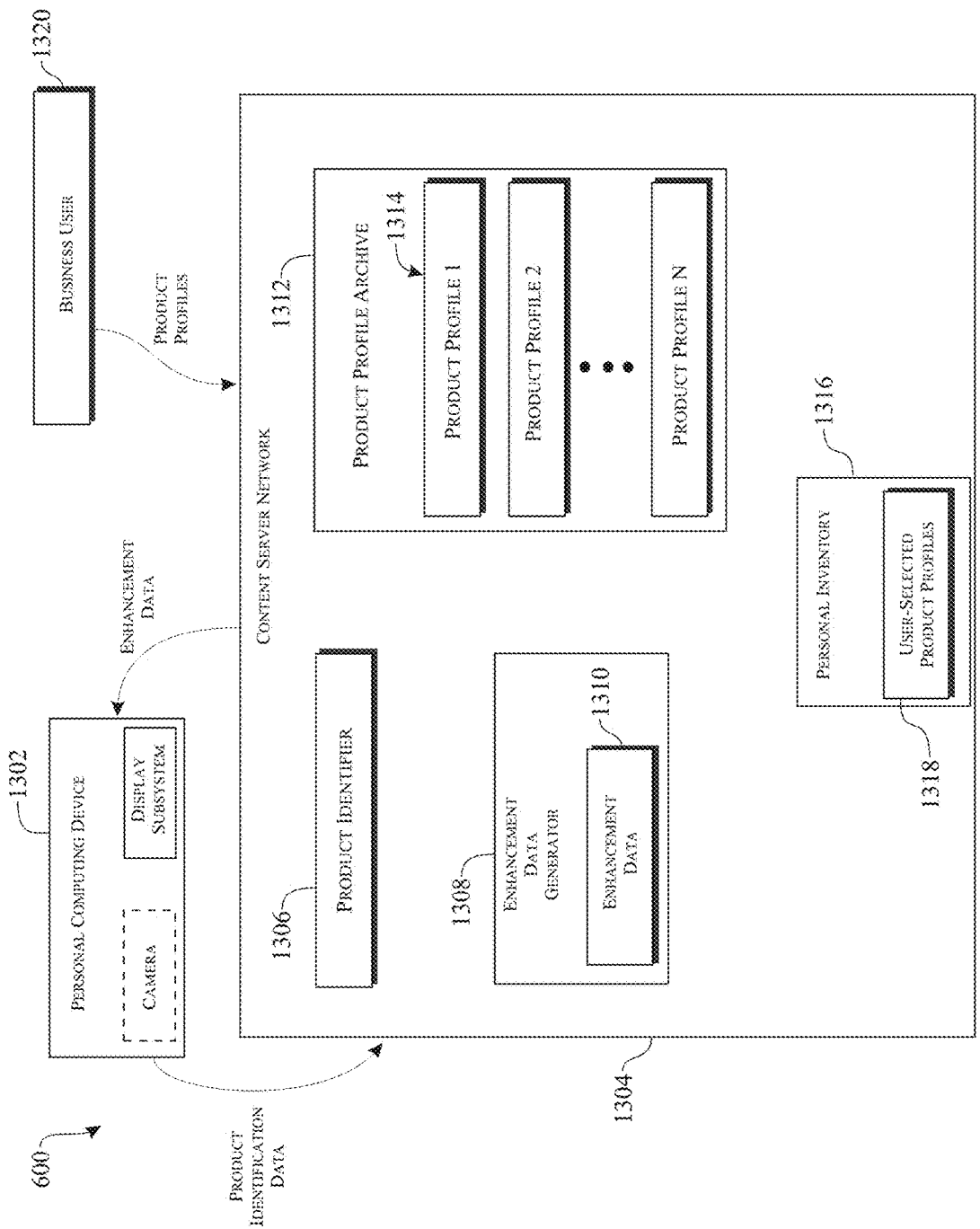
FIG. 13 schematically presents an exemplary shopping enhancing system, in accordance with aspects of the present disclosure.

The illustration of FIG. 13 presents another embodiment of the electronic commerce system 600 including a personal computing device 1302 and a content server network 1304. The personal computing device 1302 may include a camera such as a standard smartphone camera or a depth camera. In some embodiments, the depth camera shown in FIG. 13 may be separate from the personal computing device for three-dimensionally modeling a physical environment. The personal computing device 1302 also includes a display subsystem. The content server network 1304 includes a product identifier 1306 and an enhancement data generator 1308 configured to produce or generate enhancement data 1310. The content server network 1304 also includes a product profile archive 1312 which includes a plurality of archived product profiles 1314 (e.g. product profile 1, product profile 2 . . . product profile N). The content server network 1304 includes a personal inventory 1316 which includes user-selected product profiles 1318. FIG. 13 further shows the personal computing device 1302 sending product identification data to the content server network 1304. The content server network 1304 sends enhancement data to the personal computing device 1302. FIG. 13 also shows a business user 1320 sending product profiles to the content server network 1304. As such, the personal computing device 1302 receives the enhancement data, the content server network 1304 receives the product identification data and the product profiles. Upon being received, or shortly after, the product profiles may be archived or stored in the product profile archive 1312. It is to be understood that business users may receive the same data that a consumer user or a personal computing device receives as described herein.

In some embodiments the methods and/or tasks described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. For example, a suitable computing system may be computing system 1500 shown in FIG. 15. When such methods and processes are implemented, the state of the storage machine 1504 may be changed to hold different data. For example, the storage machine 1504 may include memory devices such as various hard disk drives, CD, or DVD devices. The logic machine 1502 may execute machine-readable instructions via one or more physical information and/or logic processing devices. For example, the logic machine 1502 may be configured to execute instructions to perform tasks for a computer program. The logic machine 1502 may include one or more processors to execute the machine-readable instructions. The computing system 1500 may include a display subsystem 1506 to display a graphical user interface (GUI) or any visual element of the methods or processes described above. For example, the display subsystem 1506, storage machine 1504, and logic machine 1502 may be integrated such that the above method may be executed while visual elements of the disclosed system and/or method are displayed on a display screen for user consumption. The computing system 1500 may include an input subsystem 1508 that receives user input. The input subsystem 1508 may be configured to connect to and receive input from devices such as a mouse, keyboard or gaming controller. For example, a user input may indicate a request that a certain task is to be executed by the computing system 1500, such as requesting the computing system 1500 to display any of the above described information, or requesting that the user input updates or modifies existing stored information for processing. A communication subsystem 1510 may allow the methods described above to be executed or provided over a computer network. For example, the communication subsystem 1510 may be configured to enable the computing system 1500 to communicate with a plurality of personal computing devices. The communication subsystem 1510 may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An e-commerce enhancing system, the system comprising:
   one or more storage machines holding instructions executable by one or more logic machines to:
   at a personal computing device, receive product identification data relating to a potential e-commerce interest of a user;
   at a product identifier, identify a product profile of a plurality of archived product profiles that matches the product identification data;
   at an e-commerce enhancement data generator, generate e-commerce enhancement data based on the product profile, the e-commerce enhancement data configured to enhance e-commerce experience relating to the potential e-commerce interest; and
   present the e-commerce enhancement data to the user via a display subsystem of the personal computing device;
   wherein the product identification data includes an attribute, and the instructions are further executable to:
   automatically determine if the attribute of the potential e-commerce interest is compatible with one or more attributes of the plurality of archived product profiles.

2. The e-commerce enhancing system of claim 1, where the product identification data originates from a machine-readable data tag embedded in the potential e-commerce interest.

3. The e-commerce enhancing system of claim 1, where the product identification data originates from a manual user input that specifies user preferences relating to the potential e-commerce interest.

4. The e-commerce enhancing system of claim 1, where the e-commerce enhancement data includes a targeted marketing message to market the product profile to the user according to the potential e-commerce interest.

5. The e-commerce enhancing system of claim 1, where the archived product profiles include three-dimensional virtual models.

6. The e-commerce enhancing system of claim 1, where the instructions are further executable to:
   receive a depth map of a real-world environment; and
   present the e-commerce enhancement data to the user by overlaying an augmented reality rendering of the e-commerce enhancement data on the depth map.

7. The e-commerce enhancing system of claim 1, where the instructions are further executable to:
   receive an inventory user input for modifying a personal inventory, the personal inventory being configured to hold and display user-selected product profiles; and
   present the personal inventory to the user in a three-dimensional virtual space via the display subsystem.

8. The e-commerce enhancing system of claim 1, where the product identification data is automatically received from a machine-readable data tag embedded in the potential e-commerce interest upon detecting the machine-readable data tag.

9. An e-commerce enhancing system, the system comprising:
   one or more storage machines holding instructions executable by one or more logic machines to:
   at a first computing device, receive product identification data relating to a potential e-commerce interest of a consumer user;
   at a second computing device, receive one or more product profiles from a business user, the one or more product profiles including marketing data for marketing the one or more product profiles to consumer users;
   archive the one or more product profiles in a product profile archive;
   at a product identifier, identify a product profile of the product profile archive that matches the product identification data and the marketing data;
   at an e-commerce enhancement data generator, generate e-commerce enhancement data based on the product profile and the marketing data, the e-commerce enhancement data configured to enhance e-commerce experience relating to the potential e-commerce interest; and
   present the e-commerce enhancement data to the consumer user via a display subsystem of the personal computing device; and
   where the instructions are further executable to:
   three-dimensionally model a real-world environment via a depth camera to form a depth map of the real-world environment; and
   present the e-commerce enhancement data to the consumer user by overlaying an augmented reality rendering of the e-commerce enhancement data on the depth map.

10. The e-commerce enhancing system of claim 9, where the product identification data originates from a machine-readable data tag embedded in the potential e-commerce interest.

11. The e-commerce enhancing system of claim 9, where the product identification data originates from a manual user input that specifies user preferences relating to the potential e-commerce interest, the user preferences including parameters that indicate attributes of a desired product.

12. The e-commerce enhancing system of claim 9, where the e-commerce enhancement data includes a targeted marketing message to market the product profile to the consumer user according to the potential e-commerce interest and the marketing data.

13. The e-commerce enhancing system of claim 9, where the one or more product profiles include a three-dimensional virtual model of a product.

14. The e-commerce enhancing system of claim 9, where the instructions are further executable to:
   receive an inventory user input for modifying a personal inventory, the personal inventory being configured to hold user-selected product profiles and configured to be viewed by a plurality of users; and
   present the personal inventory to an authorized user in a three-dimensional virtual space.

15. An e-commerce enhancing system, the system comprising:
   one or more storage machines holding instructions executable by one or more logic machines to:
   at a first computing device, receive product identification data in response to a detecting a potential e-commerce interest of a consumer user, the product identification data relating to the potential e-commerce interest and including location data for locating the potential e-commerce interest;

at a second computing device, receive one or more product profiles from a business user, the one or more product profiles including marketing data for appropriately marketing the one or more product profiles to consumer users;

archive the one or more product profiles in a product profile archive;

at a product identifier, identify a product profile of the product profile archive that matches the product identification data and the marketing data;

at an e-commerce enhancement data generator, generate e-commerce enhancement data based on the product profile, the marketing data, and the product identification data, the e-commerce enhancement data configured to enhance e-commerce experience relating to the potential e-commerce interest; and present the e-commerce enhancement data to the consumer user via a display subsystem of the personal computing device; and wherein the product identification data includes an attribute, and the instructions are further executable to:

automatically determine a type of the attribute of the potential e-commerce interest;

if the attribute is a specific color shade in a color spectrum, automatically determine if the specific color shade is compatible with one or more color shades of the plurality of archived product profiles;

if the attribute is a specific design, automatically determine if the design is compatible with one or more designs of the plurality of archived product profiles;

if the attribute is a specific material, automatically determine if the material is compatible with one or more materials of the plurality of archived product profiles; and if the attribute is an electronics hardware specification, automatically determine if the electronics hardware specification is compatible with one or more electronics hardware specifications of the plurality of archived product profiles.

16. The e-commerce enhancing system of claim 15, where the instructions are further executable to:

receive the location data at a locator to locate the potential e-commerce interest in a real-world e-commerce environment such that augmented reality renderings are overlayable at the location of the potential e-commerce interest to direct a user to the potential e-commerce interest.

17. The e-commerce enhancing system of claim 15, where the instructions are further executable to:

receive a depth map of a real-world environment;

generate a three-dimensional virtual personal inventory based on the depth map;

receive an inventory user input for modifying the virtual personal inventory, the personal inventory being configured to hold and display user-selected product profiles and configured to be viewed by a plurality of users, the user-selected profiles including three-dimensional models;

present the personal inventory to an authorized user via a display subsystem.

18. The e-commerce enhancing system of claim 15, where the instructions are further executable to:

three-dimensionally model a real-world product via a depth camera to form a product depth map of the real-world product; and present the e-commerce enhancement data and the product depth map to the consumer user by overlaying an augmented reality rendering of the e-commerce enhancement data and the product depth map in a three-dimensional virtual environment.

19. The e-commerce enhancing system of claim 15, where the e-commerce enhancement data includes a targeted marketing message to market the product profile to the consumer user according to the potential e-commerce interest, the marketing data, and the personal inventory.

* * * * *